US008051123B1

(12) United States Patent
Oberman et al.

(10) Patent No.: US 8,051,123 B1
(45) Date of Patent: Nov. 1, 2011

(54) MULTIPURPOSE FUNCTIONAL UNIT WITH DOUBLE-PRECISION AND FILTERING OPERATIONS

(75) Inventors: Stuart Oberman, Sunnyvale, CA (US); Ming Y. Siu, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1184 days.

(21) Appl. No.: 11/611,800

(22) Filed: Dec. 15, 2006

(51) Int. Cl.
G06F 7/38 (2006.01)
(52) U.S. Cl. ......... 708/501; 708/290; 708/507; 708/508
(58) Field of Classification Search .................. 708/290, 708/501, 507–508
See application file for complete search history.

(56) References Cited

U.S. PATENT DOCUMENTS

| | | | |
|---|---|---|---|
| 4,771,379 A | | 9/1988 | Ando et al. |
| 4,893,268 A | * | 1/1990 | Denman et al. ............... 708/627 |
| 4,969,118 A | | 11/1990 | Montoye et al. |
| 4,972,362 A | | 11/1990 | Elkind et al. |
| 5,068,816 A | | 11/1991 | Noetzel |
| 5,241,636 A | | 8/1993 | Kohn |
| 5,450,556 A | | 9/1995 | Slavenburg et al. |
| 5,452,241 A | | 9/1995 | Desrosiers et al. |
| 5,487,022 A | | 1/1996 | Simpson et al. |
| 5,517,438 A | | 5/1996 | Dao-Trong et al. |
| 5,524,090 A | | 6/1996 | Iwamura |
| 5,524,244 A | | 6/1996 | Robinson et al. |
| 5,548,545 A | | 8/1996 | Brashears et al. |
| 5,561,810 A | * | 10/1996 | Ohtomo ........................ 708/490 |
| 5,581,778 A | | 12/1996 | Chin et al. |
| 5,673,407 A | | 9/1997 | Poland et al. |
| 5,701,405 A | * | 12/1997 | Kelley et al. .................. 345/441 |
| 5,734,874 A | * | 3/1998 | Van Hook et al. ............ 345/559 |
| 6,198,488 B1 | | 3/2001 | Lindholm et al. |
| 6,243,732 B1 | | 6/2001 | Arakawa et al. |
| 6,317,133 B1 | | 11/2001 | Root et al. |
| 6,363,476 B1 | | 3/2002 | Ide |
| 6,480,872 B1 | | 11/2002 | Choquette |
| 6,490,607 B1 | | 12/2002 | Oberman |
| 6,557,022 B1 | | 4/2003 | Sih et al. |
| 6,601,781 B2 | | 8/2003 | Kah, III et al. |
| 6,873,324 B2 | | 3/2005 | Saito et al. |

(Continued)

FOREIGN PATENT DOCUMENTS

DE    11 2006 003 473 T5    10/2008

(Continued)

OTHER PUBLICATIONS

"High-Speed Double-Precision Computation of Reciprocal, Division, Square Root, and Inverse Square Root", Bruguera et al, IEEE Transactions on Computers, vol. 51, No. 12, Dec. 2002.*

(Continued)

*Primary Examiner* — Lewis Bullock, Jr.
*Assistant Examiner* — Kevin G Hughes
(74) *Attorney, Agent, or Firm* — Kilpatrick Townsend & Stockton LLP

(57) ABSTRACT

A multipurpose arithmetic functional unit selectively performs planar attribute interpolation, unary function approximation, double-precision arithmetic, and/or arbitrary filtering functions such as texture filtering, bilinear filtering, or anisotropic filtering by iterating through a multi-step multiplication operation with partial products (partial results) accumulated in an accumulation register. Shared multiplier and adder circuits are advantageously used to implement the product and sum operations for unary function approximation and planar interpolation; the same multipliers and adders are also leveraged to implement double-precision multiplication and addition.

18 Claims, 12 Drawing Sheets

U.S. PATENT DOCUMENTS

| | | | |
|---|---|---|---|
| 6,895,423 | B2 | 5/2005 | Kawata |
| 6,912,557 | B1 | 6/2005 | North et al. |
| 6,976,043 | B2 | 12/2005 | Clifton |
| 7,437,538 | B1 | 10/2008 | Brooks et al. |
| 7,484,076 | B1 | 1/2009 | Oberman et al. |
| 7,617,384 | B1 | 11/2009 | Coon et al. |
| 7,640,285 | B1 | 12/2009 | Oberman et al. |
| 7,747,842 | B1 | 6/2010 | Goudy et al. |
| 2004/0085321 | A1 | 5/2004 | Oka et al. |
| 2005/0235134 | A1 | 10/2005 | O'Sullivan |
| 2005/0273769 | A1 | 12/2005 | Eichenberger et al. |
| 2006/0098021 | A1 | 5/2006 | Rim et al. |
| 2009/0049276 | A1 | 2/2009 | Bergland et al. |

FOREIGN PATENT DOCUMENTS

| | | |
|---|---|---|
| GB | 2455401 B | 5/2010 |
| JP | 7-281872 A2 | 10/1995 |
| JP | 8-87400 A | 4/1996 |
| JP | 2008-302713 A | 12/2008 |
| KR | 10-1009095 | 12/2008 |

OTHER PUBLICATIONS

Pineiro et al., "Faithful Powering Computation Using Table Look-up and a Fused Accumulation Tree" Proceedings of the 15th IEEE Symposium on Computer Arithmetic (ARITH'01), (2001).

Jean-Michel Muller, "Partially rounded" Small-Order Approximations for Accurate, Hardware-Oriented, Table-Based Methods Proceedings of the 16th IEEE Symposium on Computer Arithmetic (ARITH'03), (2003).

Tannenbaum, Andrew, Structured Computer Organization, 2nd ed., Prentice-Hall, 1984, p. 11.

Jain, et al., "Rapid System Prototyping for High Performance Reconfigurable Computing," Design Automation for Embedded Systems, Kluwer Academic Publishers, Boston, vol. 5, pp. 339-350.

Jain, et al., "Hardware Implementation, of a Nonlinear Processor," Proceedings of the 1999 IEEE International Symposium on Circuits and Systems, May 30-Jun. 2, 1999, vol. 6, pp. 509-514.

Ligon, et al., "Implementation and Analysis of Numerical Components for Reconfigurable Computing," Proceedings of the 1999 IEEE Aerospace Conference, Mar. 6-13, 1999, vol. 2, pp. 325-335.

Kurzak, Jakub et al.; "Implementation of the Mixed-Precision High Performance LINPACK Benchmark on the CELL Processor"; 2006, Technical Report No. UT-CS-06-580, Department of Computer Science, University of Tennessee, 12 pages.

Owens, John D., et al., "A Survey of General-Purpose Computation on Graphics Hardware," Eurographics 2005, State of Art Reports, pp. 21-51, (Aug. 2005).

Schwarz, Eric M., "FPU Implementations with Denormalized Numbers," IEEE Trans. on Computers, vol. 55. No. 7. pp. 825-835, (Jul. 2005).

He, Hu, et al., "Multiply-Add Fused Float Point Unit with On-fly Denormalized Number Processing," IEEE, pp. 1466-1468, (2005).

Bedard, N., et al., "The Weitek 64-bit Floating-Point Datapath Unit," Weitek Corporation, Maple Press, pp. 898-902, (1988).

Office Action dated May 25, 2011, Japanese Patent Application No. 2007-541334, in related case 019680-012000JP, 3 pages (in Japanese).

Great Britain Examination Report of Mar. 25, 2009 in Application No. GB0821495.9.

Office Action of Jan. 7, 2010 in related U.S. Appl. No. 11/359,353.
Office Action of Dec. 7, 2010 in related U.S. Appl. No. 11/359,353.
Office Action of Jul. 20, 2010 in related U.S. Appl. No. 11/359,353.
Office Action of Dec. 18, 2007 in related U.S. Appl. No. 10/970,253.
Office Action of Jul. 31, 2008 in related U.S. Appl. No. 10/970,253.
Office Action of Oct. 14, 2009 in related U.S. Appl. No. 10/970,253.
Office Action of Aug. 31, 2010 in related U.S. Appl. No. 10/970,253.
Office Action of Feb. 10, 2011 in related U.S. Appl. No. 10/970,253.
Office Action of Feb. 17, 2011 in related U.S. Appl. No. 11/952,858.
Office Action of Jun. 7, 2011 in related U.S. Appl. No. 11/952,858.

* cited by examiner

UNARY FUNCTION APPROXIMATION (UFA)

| NAME | REDUCED RANGE | OPERAND FORMAT | RESULT | POST-PROCESSING |
|---|---|---|---|---|
| SIN, COS | [0,1) | 25 fraction bits (x) | sin x, cos x | (none) |
| EXP | n/a | 7 integer bits (I) 23 fraction bits (x) | $2^x$ | $*2^I$ |
| LOG | n/a | fp32 (s.$E.M$); x=1.$M$ | $\log_2 x + E$ | (none) |
| RCP | [1,2) | fp32 (s.$E.M$); x=1.$M$ | $1/x$ | $*2^{-E}$ |
| RSQ | [1,4) | fp32 (s.$E.M$); x=1.$M$ | $x^{-1/2}$ | $*2^{-E/2}$ |

PLANAR INTERPOLATION (PI)

| NAME | INPUTS | RESULT |
|---|---|---|
| IPA | A,B,C: fp32<br>x,y: s13 | U=A*x+B*y+C |
| IPAW | A,B,C: fp32<br>x,y: s13 | U*w'<br>where U=A*x+B*y+C |

DOUBLE-PRECISION ARITHMETIC

| NAME | INPUTS | RESULT |
|---|---|---|
| DADD | α,β: fp64 | α+β |
| DMUL | α,β: fp64 | α*β |

LINEAR FILTERING

| NAME | INPUTS | RESULT |
|---|---|---|
| FILT | $A_0,A_1,B_0,B_1$: fp16<br>C: fp32<br>$w_0,w_1,w_2,w_3$: s13 | $A_0*w_0+A_1*w_1+B_0*w_2+B_1*w_3+C$ |

FIG. 3

MULTIPURPOSE FUNCTIONAL UNIT WITH DOUBLE-PRECISION AND FILTERING OPERATIONS

CROSS-REFERENCES TO RELATED APPLICATIONS

The present disclosure is related to the following commonly-assigned co-pending U.S. patent application Ser. No. 10/861,184, filed Jun. 3, 2004, entitled "High-Speed Function Approximation"; application Ser. No. 10/970,101, filed Oct. 20, 2004, entitled "Multipurpose Arithmetic Functional Unit"; application Ser. No. 10/970,253, filed Oct. 20, 2004, entitled "Multipurpose Arithmetic Functional Unit;" and application Ser. No. 11/359,353, filed Feb. 21, 2006, entitled "Multipurpose Functional Unit with Single Precision and Double Precision Operations." The respective disclosures of these applications are incorporated herein by reference for all purposes.

BACKGROUND OF THE INVENTION

The present invention relates in general to microprocessors, and in particular to a multipurpose arithmetic functional unit for a processor core with single-precision and double-precision operations.

Real-time computer animation places extreme demands on processors. To meet these demands, dedicated graphics processing units typically implement a highly parallel architecture in which a number (e.g., 16) of cores operate in parallel, with each core including multiple (e.g., 8) parallel pipelines containing functional units for performing the operations supported by the processing unit. These operations generally include various integer and floating point arithmetic operations such as addition; multiplication; various algebraic, transcendental, and trigonometric functions; and planar attribute interpolation. The pipelines are generally of identical design so that any supported instruction can be processed by any pipeline; accordingly, each pipeline requires a complete set of functional units.

Conventionally, each functional unit is specialized to handle only one or two operations, and the pipelines usually provide sequential arrangements of functional units designed to optimize execution time for an expected sequence of operations (e.g., for vertex or fragment shading operations). For example, the functional units in a pipeline might include an attribute interpolation unit, followed by a texture computation unit, followed by various arithmetic units for computing sums, products, logarithms, exponents, trigonometric functions, and the like. Each of these functional units consumes chip area and power, adding to the design complexity and cost. Further, because it is specialized, a given functional unit is useful only a fraction of the time. It would, therefore, be desirable to provide functional units capable of a greater variety of operations.

Conventional functional units for graphics processors are also designed to operate on "single-precision" (e.g., 32-bit) operands and produce single-precision results. Operating at double precision generally requires wider adders and larger multipliers than single-precision operations. These double-precision circuits can be used for single-precision arithmetic, in some instances at the price of additional complexity. Some processors include separate single-precision and double-precision functional units, but providing two sets of functional units increases chip area and costs.

Graphics applications, at least at present, do not generally use double precision. However, there is interest in leveraging graphics processors for general-purpose computations, which often do require double precision. It would, therefore, be desirable to provide functional units capable of single-precision and double-precision operations at low additional cost, allowing graphics processors to be used for a wider range of computational tasks.

BRIEF SUMMARY OF THE INVENTION

Embodiments of the present invention provide high-speed multipurpose arithmetic functional units that support a variety of operations, including various combinations of filtering, function approximation, planar interpolation, and double-precision arithmetic operations. Such functional units may be used in any processing system capable of performing large numbers of high-speed computations, such as a graphics processor. In one embodiment, the functional unit executes a linear filtering operation of the form $R=A_0*w_0+A_1*w_1+B_0*w_2+B_1*w_3+C$ and also executes double-precision addition and multiplication operations. The functional unit can also execute single-precision planar interpolation operations by computing $U(x,y)=A*x+B*y+C$ and single-precision unary function operations by computing an approximation of the form $f(x) \approx F_2(x_b)*x_h^2+F_1(x_b)*x_h+F_0(x_b)$ (where $x_h=x-x_b$). This approximation can be used for various algebraic and transcendental functions including reciprocals, square roots, logarithms, exponents, and trigonometric functions. Shared multiplier and adder circuits are advantageously used to implement the product and sum operations for all classes of operations.

According to one aspect of the present invention, a multipurpose functional unit for a processor includes an input section, a multiplication pipeline, and an addition pipeline. The input section is configured to receive an opcode designating one of a plurality of supported operations to be performed and one or more operands on which the designated operation is to be performed and is also configured to generate control and data signals in response to the received opcode and operands. The multiplication pipeline, which includes at least two multiplier circuits, is configured to receive a first subset of the control and data signals from the input section. The multiplication pipeline is also configured to select factors based on the received control and data signals and to operate the multiplier circuits to compute one or more products from the selected factors. The addition pipeline is configured to selectively receive one or more products from the multiplication pipeline and to perform an addition operation using the one or more products to produce an operation result. The supported operations include a linear filtering (FILT) operation that filters multiple coordinate values using multiple coefficients and a double precision multiplication (DMUL) operation. The FILT operation is executed in a single pass through the multiplication pipeline and the addition pipeline, and the DMUL operation is executed using multiple iterations through at least a portion of the multiplication pipeline and at least a portion of the addition pipeline.

In some embodiments, the multiplication pipeline includes at least two sub product blocks. Each sub-product block includes a pair of multiplier circuits, with each of the multiplier circuits in the pair having a width less than half of a double precision mantissa size. A pair of alignment circuits is coupled to the pair of multiplier circuits. The pair of alignment circuits is configured to apply an alignment shift to the products of the pair of multiplier circuits in response to one of the first subset of control signals. An adder circuit is coupled to the pair of alignment circuits. The adder circuit is configured to receive the aligned products from the pair of alignment circuits and to add the aligned products to generate a product. In the event that the opcode designates the DMUL operation, during each iteration through the multiplication pipeline, each of the multiplier circuits in each of the sub product blocks multiplies a different portion of a first double precision mantissa by a same portion of a second double precision mantissa. In the event that the opcode designates the FILT operation, each of the multiplier circuits in each of the sub product blocks multiplies a different one of the filter coefficients by a different one of the coordinates.

In some embodiments, other operations may also be supported, including, e.g., a unary function approximation (UFA) operation and/or a planar interpolation (PI) operation, each of which can be executed using a single pass through the multiplication pipeline and the addition pipeline.

According to another aspect of the present invention, a graphics processor includes a multipurpose functional unit configured to receive an opcode designating one of a number of supported operations to be performed and one or more operands on which the designated operation is to be performed. The multipurpose functional unit has an input section, a multiplication pipeline, and an addition pipeline. The input section is configured to receive an opcode designating one of a plurality of supported operations to be performed and one or more operands on which the designated operation is to be performed and is also configured to generate control and data signals in response to the received opcode and operands. The multiplication pipeline, which includes at least two multiplier circuits, is configured to receive a first subset of the control and data signals from the input section. The multiplication pipeline is also configured to select factors based on the received control and data signals and to operate the multiplier circuits to compute one or more products from the selected factors. The addition pipeline is configured to selectively receive one or more products from the multiplication pipeline and to perform an addition operation using the one or more products to produce an operation result. The supported operations include at least one single precision operation that includes computing a sum of products at a single precision or a lower precision and a double-precision multiplication (DMUL) operation. In some embodiments, the single-precision operation(s) is (are) performed in a single pass through the multiplication pipeline and the addition pipeline, and the DMUL operation is executed using multiple iterations through at least a portion of the multiplication pipeline and at least a portion of the addition pipeline.

Various single-precision operations can be supported. One such operation is a linear filtering operation that can be used, e.g., to perform texture filtering and/or anisotropic filtering. Other operations include unary function approximation and/or a planar interpolation operations.

According to another aspect of the present invention, a method for operating a functional unit of a processor is provided. The functional unit receives an opcode designating one of a number of supported operations to be performed and one or more operands on which the designated operation is to be performed. The supported operations include at least a double precision multiplication (DMUL) operation and a linear filtering (FILT) operation that operates on operands at less than double precision. If the opcode designates the FILT operation, at least two multiplier circuits in the functional unit are operated in parallel to compute products of at least two coefficient operands and a corresponding number of coordinate operands. Adders in the functional unit are operated in parallel to add pairs of the products to compute partial sums. A further addition block in the functional unit is operated to add the partial sums computed by the plurality of adders. If the opcode designates the DMUL operation, the multiplier circuits in the functional unit are operated in parallel to compute respective products of different portions of a mantissa of a first operand with a same portion of a mantissa of a second operand. The adders in the functional unit are operated in parallel to add pairs of the products to compute partial sums. The further addition block in the functional unit is operated to add the partial sums to a running sum. Other operations, such as unary function approximation and/or planar interpolation, can also be performed by computing and adding products.

The following detailed description together with the accompanying drawings will provide a better understanding of the nature and advantages of the present invention.

BRIEF DESCRIPTION OF THE DRAWINGS

FIG. 3 is a listing of operations performed by a multipurpose arithmetic functional unit according to an embodiment of the present invention;

DETAILED DESCRIPTION OF THE INVENTION

Embodiments of the present invention provide high-speed multipurpose arithmetic functional units that support a variety of operations, including various combinations of filtering, function approximation, planar interpolation, and double-precision arithmetic operations. Such functional units may be used in any processing system capable of performing large numbers of high-speed computations, such as a graphics processor. In one embodiment, the functional unit executes a linear filtering operation of the form $R=A_0*w_0+A_1*w_1+B_0*w_2+B_1*w_3+C$ and also executes double-precision addition and multiplication operations. The functional unit can also execute single-precision planar interpolation operations by computing $U(x, y)=A*x+B*y+C$ and single-precision unary function operations by computing an approximation of the form $f(x) \approx F_2(x_b)*x_h^2 + F_1(x_b)*x_h + F_0(x_b)$ (where $x_h = x - x_b$). This approximation can be used for various algebraic and transcendental functions including reciprocals, square roots, logarithms, exponents, and trigonometric functions. Shared multiplier and adder circuits are advantageously used to implement the product and sum operations for all classes of operations.

I. System Overview

A. Graphics Processor

Figure 1:
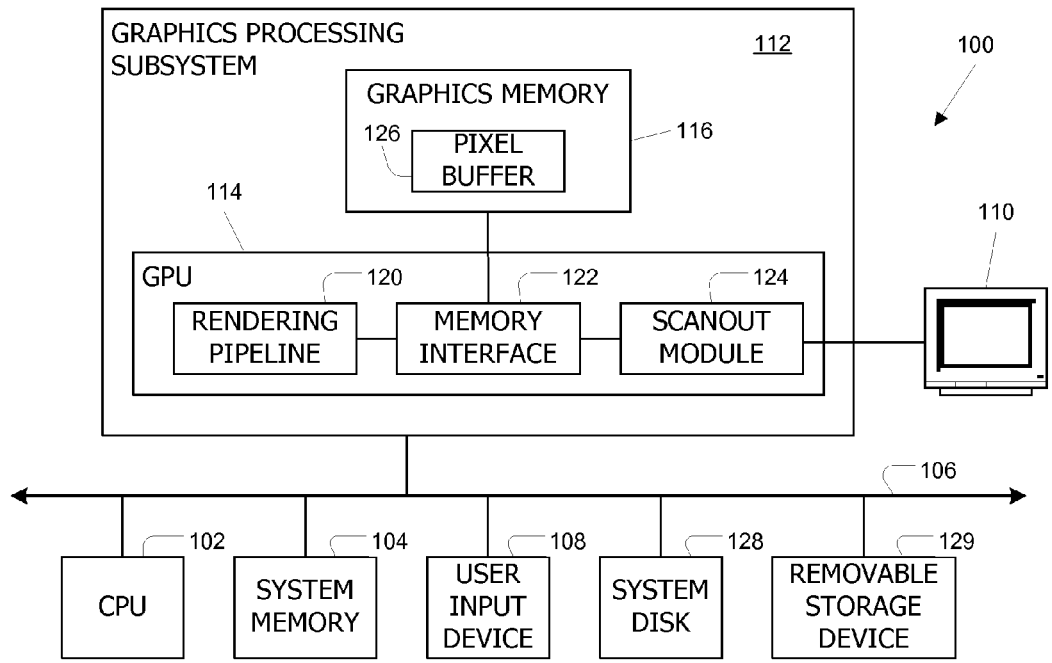
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Accelerated Graphics Port), HyperTransport, and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a rendering module 120, a memory interface module 122, and a scanout module 124. Rendering module 120 may be configured to perform various tasks related to generating pixel data from graphics data supplied via system bus 106 (e.g., implementing various 2D and or 3D rendering algorithms), interacting with graphics memory 116 to store and update pixel data, and the like. Rendering module 120 is advantageously configured to generate pixel data from 2-D or 3-D scene data provided by various programs executing on CPU 102. The particular configuration of rendering module 120 may be varied as desired, and a detailed description is omitted as not being critical to understanding the present invention.

Memory interface module 122, which communicates with rendering module 120 and scanout control logic 124, manages all interactions with graphics memory 116. Memory interface module 122 may also include pathways for writing pixel data received from system bus 106 to graphics memory 116 without processing by rendering module 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126. Pixel buffer 126 stores pixel data for an image (or for a part of an image) that is read and processed by scanout control logic 124 and transmitted to display device 110 for display. This pixel data may be generated, e.g., from 2D or 3D scene data provided to rendering module 120 of GPU 114 via system bus 106 or generated by various processes executing on CPU 102 and provided to pixel buffer 126 via system bus 106.

Scanout module 124, which may be integrated in a single chip with GPU 114 or implemented in a separate chip, reads pixel color data from pixel buffer 118 and transfers the data to display device 110 to be displayed. In one embodiment, scanout module 124 operates isochronously, scanning out frames of pixel data at a prescribed refresh rate (e.g., 80 Hz) regardless of any other activity that may be occurring in GPU 114 or elsewhere in system 100. In some embodiments, the prescribed refresh rate can be a user selectable parameter, and the scanout order may be varied as appropriate to the display format (e.g., interlaced or progressive scan). Scanout module 124 may also perform other operations, such as adjusting color values for particular display hardware and/or generating composite screen images by combining the pixel data from pixel buffer 126 with data for a video or cursor overlay image or the like, which may be obtained, e.g., from graphics memory 116, system memory 104, or another data source (not shown). The particular configuration of scanout module 124 may be varied as desired, and a detailed description is omitted as not being critical to understanding the present invention.

During operation of system 100, CPU 102 executes various programs such as operating system programs, application programs, and driver programs for graphics processing subsystem 112. The driver programs may implement conventional application program interfaces (APIs) such as OpenGL, Microsoft DirectX or D3D that enable application and operating system programs to invoke various functions of graphics processing subsystem 112 as is known in the art. In some embodiments, the driver programs may also implement an API for leveraging the processing power of GPU 114 to perform general-purpose computations. In such embodiments, GPU 114 advantageously writes general-purpose computation results to graphics memory 116 or system memory 104, making the results accessible to CPU 102; general-purpose computation results are advantageously not scanned out to a display device by scanout module 124. Operation of graphics processing subsystem 112 may be made asynchronous with other system operations through the use of appropriate command buffers.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). In some embodiments, some or all components of a GPU may be integrated with the CPU. The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof.

It is also to be understood that any number of GPUs may be included in a system, e.g., by including multiple GPUs on a single graphics card or by connecting multiple graphics cards to a system bus. Multiple GPUs may be operated in parallel to generate images for the same display device or for different display devices.

In addition, GPUs or other processors embodying aspects of the present invention may be incorporated into a variety of devices, including general purpose computer systems, video game consoles and other special purpose computer systems, DVD players, handheld devices such as mobile phones or personal digital assistants, embedded systems and so on.

B. Execution Core

Figure 2:
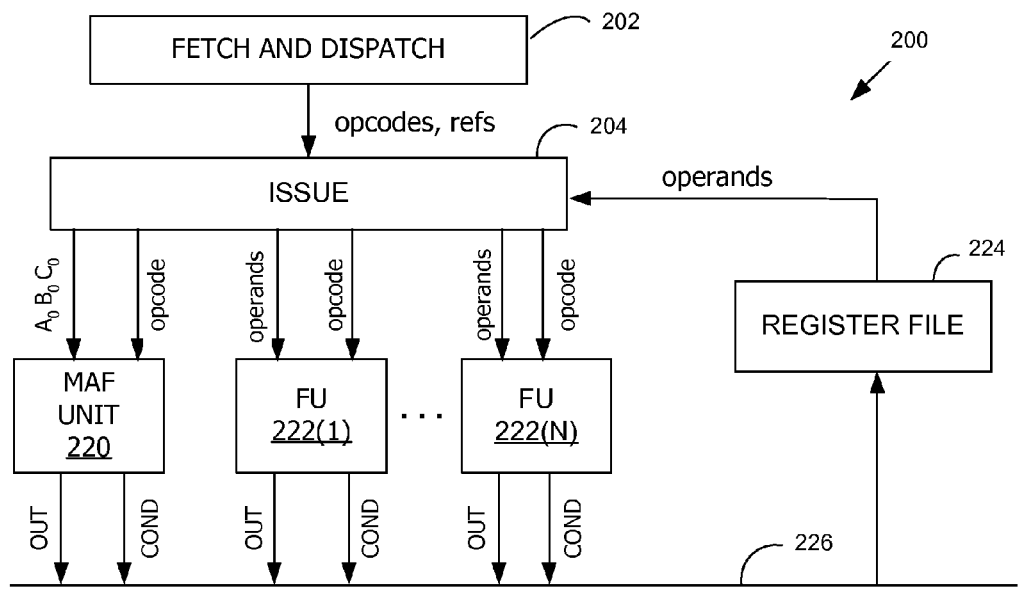
FIG. 2 is a block diagram of a portion of an execution core according to an embodiment of the present invention.

FIG. 2 is a block diagram of an execution core 200 according to an embodiment of the present invention. Execution core 200, which may be implemented, e.g., in a programmable shader unit for rendering module 120 of GPU 114 described above, is configured to execute arbitrary sequences of instructions for performing various computations. In some embodiments, the same execution core 200 can be used to execute shader programs at all phases of rendering, including vertex shader, geometry shader, and/or pixel shader programs.

Execution core 200 includes a fetch and dispatch unit 202, an issue unit 204, a multipurpose arithmetic functional (MAF) unit 220, a number (M) of other functional units (FU) 222, and a register file 224. Each functional unit 220, 222 is configured to perform specified operations. The operations performed by MAF unit 220 are described below. The other functional units 222 may be of generally conventional design and may support a variety of operations such as addition, multiplication, bitwise logic operations, comparison operations, format conversion operations, texture filtering, memory access (e.g., load and store operations), and so on.

During operation of execution core 200, fetch and dispatch unit 202 obtains instructions from an instruction store (not shown), decodes them, and dispatches them as opcodes with associated operand references or operand data to issue unit 204. For each instruction, issue unit 204 obtains any referenced operands, e.g., from register file 224. When all operands for an instruction are ready, issue unit 204 issues the instruction by sending the opcode and operands to MAF unit 220 or another functional unit 222. Issue unit 204 advantageously uses the opcode to select the appropriate functional unit to execute a given instruction. Fetch and dispatch unit 202 and issue unit 204 may be implemented using conventional microprocessor architectures and techniques, and a detailed description is omitted as not being critical to understanding the present invention.

MAF unit 220 and other functional units 222 receive the opcodes and associated operands and perform the specified operation on the operands. Result data is provided in the form of result values that can be forwarded to register file 224 (or another destination) via a data transfer path 226.

It will be appreciated that the execution core of FIG. 2 is illustrative and that variations and modifications are possible. Any number of cores may be included in a processor. Fetch and dispatch unit 202 and issue unit 204 may implement any desired microarchitecture, including scalar or superscalar architectures with in-order or out-of-order instruction issue, speculative execution modes, single-instruction, multiple data (SIMD) instruction issue, and so on as desired. In some architectures, the issue unit may receive and/or issue a long instruction word that includes opcodes and operands for multiple functional units or multiple opcodes and/or operands for one functional unit. In some architectures, the execution core may include multiple instances of each functional unit operable in parallel, e.g., for execution of SIMD instructions. The execution core may also include a sequence of pipelined functional units in which results from functional units in one stage are forwarded to functional units in later stages rather than directly to a register file; the functional units in such a configuration can be controlled by a single long instruction word or separate instructions.

Additionally, persons of ordinary skill in the art with access to the present teachings will recognize that MAF unit 220 can be implemented as a functional unit in any microprocessor, not limited to graphics processors or to any particular processor or execution core architecture. For instance, MAF unit 220 could be implemented in a general-purpose parallel processing unit or a CPU.

C. MAF Unit

In accordance with one embodiment of the present invention, execution core 200 includes a MAF unit 220 that executes four classes of operations: planar interpolation (PI), unary function approximation (UFA), double-precision arithmetic, and linear filtering (FILT). MAF unit 220 advantageously handles inputs and outputs in various floating-point and fixed-point formats, and operands for different operations can be in different formats. Before describing an embodiment of MAF unit 220, representative formats will be defined.

"Fp32", as used herein, refers to the standard IEEE 754 single-precision floating-point format, in which a normal floating point number is represented by a sign bit, eight exponent bits, and 23 significand bits. The exponent is biased upward by 127 so that exponents in the range $2^{-126}$ to $2^{127}$ are represented using integers from 1 to 254. For "normal" numbers, the 23 significand bits are interpreted as the fractional portion of a 24-bit mantissa with an implied 1 as the integer portion.

"Fp64," as used herein refers to the standard IEEE 754 double-precision floating-point format, in which a normal floating point number is represented by a sign bit, 11 exponent bits and 52 significand bits. The exponent is biased upward by 1023 so that exponents in the range $2^{-1022}$ to $2^{1023}$ are represented using integers from 1 to 2046. For "normal" numbers the 52 significand bits are interpreted as the fractional portion of a 53-bit mantissa with an implied 1 as the integer portion.

"Fp16," as used herein refers to a "half-precision" floating-point format commonly used in graphics, in which a normal floating point number is represented by a sign bit, 5 exponent bits and 10 significand bits. The exponent is biased upward by 15 so that exponents in the range $2^{-14}$ to $2^{15}$ are represented using integers from 1 to 30. For "normal" numbers the significand bits are interpreted as the fractional portion of an 11-bit mantissa with an implied 1 as the integer portion.

In fp16, fp32 and fp64 formats, numbers with all zeroes in the exponent bits are referred to as denorms and are interpreted as not having an implied leading 1 in the mantissa; such numbers may represent, e.g., an underflow in a computation. The (positive or negative) number with all ones in the exponent bits and zeroes in the significand bits are referred to as (positive or negative) INF; this number may represent, e.g., an overflow in a computation. Numbers with all ones in the exponent bits and a non-zero number in the significand bits are referred to as Not a Number (NaN) and may be used, e.g., to represent a value that is undefined. Zero is also considered a special number and is represented by all of the exponent and significand bits being set to zero.

Fixed-point formats are specified herein by an initial "s" or "u" indicating whether the format is signed or unsigned and a number denoting the total number of bits (e.g., 4, 13); thus, s13 refers to signed 13-bit format, u4 to an unsigned four-bit format and so on. For the signed formats, two's complement negation is advantageously used. In all formats used herein, the most significant bit (MSB) is at the left of the bit field and the least significant bit (LSB) is at the right.

It is to be understood that these formats are defined and referred to herein for purposes of illustration and that a MAF unit might support any combination of these formats or different formats without departing from the scope of the present invention. In particular, it is to be understood that "single-precision" and "double-precision" can refer to any two different floating-point formats, not limited to currently defined standards; a double-precision format (e.g., fp64) refers to any format that uses a larger number of bits than a related single-precision format (e.g., fp32) to represent a larger range of floating-point numbers and/or to represent floating-point values to a higher degree of precision. Similarly, "half-precision" can refer generally to a format that uses fewer bits than a related single-precision format to represent a smaller range of floating-point numbers and/or to represent floating-point numbers with a lower degree of precision.

An embodiment of MAF unit 220 according to the present invention will now be described. FIG. 3 lists unary function approximation (UFA) operations, planar interpolation (PI) operations, double-precision arithmetic operations, and linear filtering (FILT) operations that can be performed by this embodiment of MAF unit 220.

UFA operations (listed at 302) include a variety of algebraic and transcendental functions $f(x)$ that can be computed using a polynomial approximation, such as trigonometric functions (SIN, COS), exponential (EXP), logarithm (LOG), reciprocal (RCP), and reciprocal square root (RSQ). It is to be understood that MAF unit 220 may support any combination of unary functions, not limited to those listed in FIG. 3.

In one embodiment, MAF unit 220 executes each UFA operation by computing a polynomial approximation of the form:

$$f(x) \approx F_2(x_b)*x_h^2 + F_1(x_b)*x_h + F_0(x_b), \qquad (Eq. 1)$$

where $x_b$ is a "baseline" value that is close to x and $x_h$ is the difference between $x_b$ and x. A finite number of base values $x_b$ is selected, and for each $x_b$, a set of coefficients $F_2$, $F_1$, $F_0$ is determined. Different unary functions $f(x)$ will generally have different coefficients $F_2$, $F_1$, $F_0$ for a given $x_b$, and may also use different values of $x_b$. Numerous techniques for determining coefficients for polynomial approximations to functions are known in the art; examples are described in above-referenced application Ser. No. 10/861,184.

MAF unit 220 advantageously includes lookup tables (LUTs) or other data storage circuits that are pre-loaded with sets of values of $F_2(x_b)$, $F_1(x_b)$ and $F_0(x_b)$ for each supported UFA operation. MAF unit 220 also includes multiplier and adder circuits arranged to compute Eq. 1. When a UFA operation is executed, the coefficients are retrieved from the lookup tables based on the operand x, and the computation is performed.

To reduce the size of the lookup tables for a given UFA operation, argument reduction is advantageously applied to operand x before operand x is supplied to MAF unit 220. Argument reduction (also referred to as range reduction) is well known in the art and refers generally to limiting the argument x of a function to some bounded interval. For example, the functions sin x and cos x are both periodic with period $2\pi$. Thus, sin x for arbitrary x can be computed by reducing the argument x according to $x = x_0 + 2\pi K$, where K is an integer and $0 \leq x_0 < 2\pi$, then computing sin $x_0$ = sin x. In some implementations, the reduced argument $x_0$ is specified as a fraction $x_R = x_0/2\pi$, where $0 \leq x_R < 1$. Similarly, the reciprocal of an operand x can be computed by expressing x as $x_R*2^E$, where $1 \leq x_R < 2$. The reciprocal of $2^E$ is just $2^{-E}$, and the reciprocal of a reduced operand $x_R$ can be computed using lookup tables that cover just the interval [1, 2). (The reciprocal of x will always have the same sign as x, so it is not necessarily to consider negative x values separately.)

Section 302 of FIG. 3 summarizes the ranges and input formats for the UFA operations supported by MAF unit 220 in this embodiment. Argument reduction can be implemented in a separate functional unit from MAF unit 220, with the result of the argument reduction operation being provided to MAF unit 220. Argument reduction techniques for each operation listed in section 302 are known in the art; for purposes of the present description, it is assumed that MAF unit 220 receives arguments (operand x) in reduced form. For some operations, post-processing (in the form of scaling by a power of 2) is applied as shown in FIG. 3. Such post-processing may be implemented in circuits other than MAF unit 220; such circuits can be of conventional design, and a detailed description of this post-processing is omitted.

In addition to UFA operations, MAF unit 220 also supports two planar interpolation (PI) operations, listed at section 304 in FIG. 3. "IPA" denotes planar attribute interpolation without perspective correction, and "IPAW" denotes planar attribute interpolation with perspective correction.

In general, planar interpolation for an attribute U in an (x, y) plane involves computing a function of the form:

$$U(x,y) = A*x + B*y + C, \qquad (Eq. 2)$$

where A, B and C are interpolation parameters associated with attribute U. As is known in the art, in graphics applications, attributes such as color, texture and so on are usually specified for vertices of primitives that make up a scene to be rendered. These attributes are interpolated in the (x, y) screen plane as needed to determine the color of pixels covered by the primitive. The graphics processor typically includes a circuit configured to compute interpolation parameters A, B, and C; the details of such computations are not relevant to the present invention. In the embodiments described herein, MAF unit 220 receives as operands a set of previously computed interpolation parameters A, B, and C in fp16 format and the coordinates (x, y) for a sampling location in s13 format and computes Eq. 2. In some embodiments, MAF unit 220 is capable of performing attribute interpolation for multiple sample locations (x, y) in parallel; examples are described in above-referenced application Ser. No. 11/359,353.

The IPA and IPAW operations in FIG. 3 differ from each other in that, for IPAW, perspective correction is applied to the interpolated attribute U. As is known in the art, perspective can be modeled using homogeneous coordinates (x, y, w) defined such that coordinates $(\lambda x, \lambda y, \lambda w)$ for all $\lambda \cdot 0$ map to the same 2-D coordinates. An attribute value u=U/w is provided for each vertex of the primitive. For perspective correct interpolation, the IPA operation can be used to interpolate (1/w) as an attribute (using Eq. 2 or Eq. 3). An interpolated perspective parameter w' is determined by computing the reciprocal of interpolated (1/w). The attribute u is interpolated (again using Eq. 2 or Eq. 3) to obtain $u_0$, and the perspective-correct attribute U is determined by multiplying $u_0*w'$. Thus, IPA and IPAW operations differ in that IPAW includes an extra multiplication.

MAF unit 220 is advantageously configured to compute Eq. 1 (for unary functions) and Eq. 2 (for planar interpolation) using the same multiplier and adder circuits. Specifically, Eqs. 1 and 2 both have the same general form:

$$\text{Result} = M2*\mu2 + M1*\mu1 + M0. \qquad (Eq. 3)$$

In MAF unit 220, this similarity is exploited by configuring the same multipliers and adders to compute Eq. 1 or Eq. 2, depending on whether the opcode received from issue circuit 204 designates a UFA or PI operation.

In addition to UFA and PI operations, MAF unit 220 also supports double-precision arithmetic operations listed at section 306 of FIG. 3. A double-precision addition (DADD) operation computes the sum of two double-precision inputs ($\alpha$ and $\beta$), and a double-precision multiply (DMUL) operation computes the product of double-precision inputs $\alpha$ and $\beta$.

In addition to these operations, MAF unit 220 advantageously also implements a linear filtering (FILT) operation, listed in section 308. The FILT operation can be used to implement a four-component linear filter with accumulation. As indicated in section 308, the FILT operation takes four fp16 coefficients ($A_0$, $A_1$, $B_0$, $B_1$), an fp32 accumulation value C and four s13 coordinate values ($w_0$, $w_1$, $w_2$, $w_3$) and computes a result R:

$$R = A_0 * w_0 + A_1 * w_1 + B_0 * w_2 + B_1 * w_3 + C. \quad \text{(Eq. 4)}$$

Such filters can be used, e.g., in texture operations during image rendering. For example, Eq. 4 can be used for bilinear filtering as is known in the art. Eq. 4 supports accumulative iteration using different sets of coefficients and coordinates, with the computed value of R from one iteration being provided as accumulation value C on the next iteration (on the initial iteration, C may be set to zero). Accumulative iteration of Eq. 4 can be used to support anisotropic filtering and other accumulative filtering techniques.

The FILT operation of Eq. 4 can also be computed according to Eq. 3, with:

$$M2 * \mu 2 = A_0 * w_0 + A_1 * w_1; \quad \text{(Eq. 5a)}$$

$$M1 * \mu 1 = B_0 * w_1 + B_1 * w_3; \quad \text{(Eq. 5b)}$$

and $$M0 = C. \quad \text{(Eq. 5c)}$$

In one embodiment of the present invention, DMUL operations, FILT operations, PI operations and UFA operations are implemented using the same set of multipliers and adders. During FILT operations, four multipliers are used in parallel to compute Eqs. 5a and 5b. During UFA or PI operations, pairs of the multipliers are used together to compute $M2*\mu 2$ and $M1*\mu 1$ for Eq. 1 or Eq. 2. The four multipliers together are advantageously smaller than the size required to multiply two double-precision mantissas (e.g., 53×53 bits for fp64), and during DMUL operations, MAF unit 220 generates the double-precision product by executing a sequence of partial multiplications using all four multipliers. Herein, multiplier "size" refers to the maximum number of multiplicand and multiplier bits that the multiplier can process; size can be expressed in the form s1×s2, where s1 (multiplicand size, or "width") and s2 (multiplier size, or "height") need not be equal.

Figure 4A:
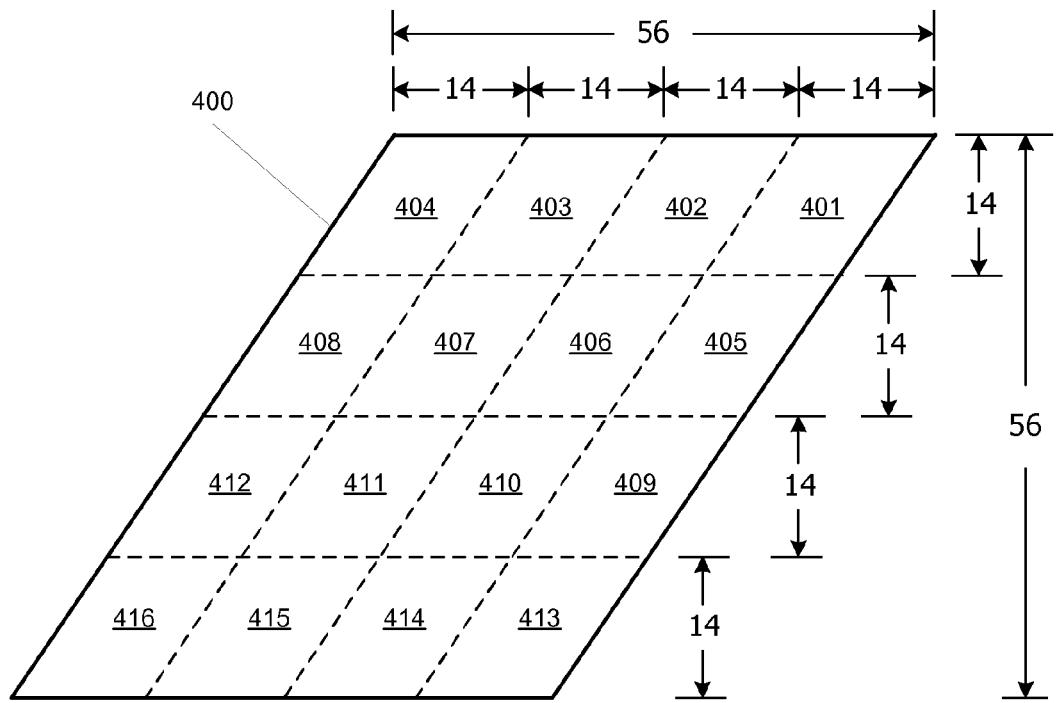
FIGS. 4A and 4B illustrate an operating principle of the present invention related to double-precision multiplication.
Figure 4B:
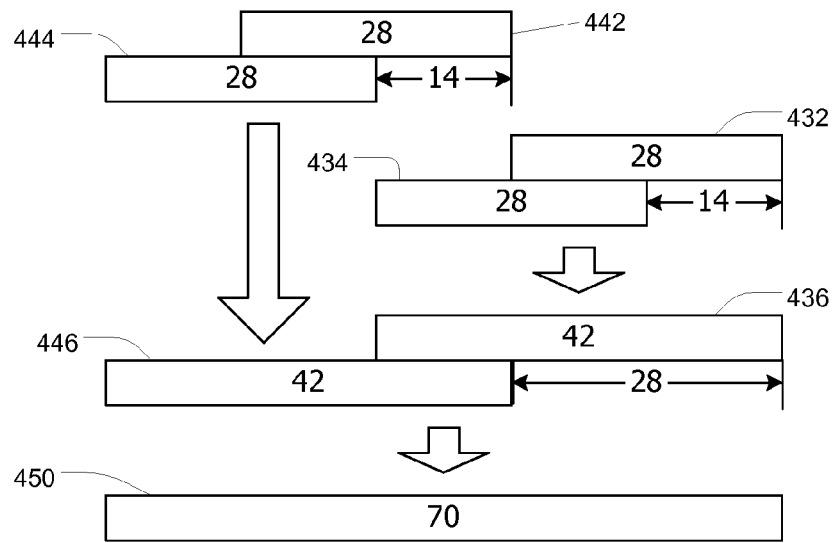

FIGS. 4A and 4B illustrate an operating principle of the present invention. In FIG. 4A, a parallelogram 400 represents partial products for a multiplication of a 56-bit multiplicand by a 56-bit multiplier. It is to be understood that parallelogram 400 represents 56 rows containing 56 bits each, with each row being left-shifted by 1 bit relative to the row immediately above (the trailing zeroes introduced by left-shifting are suppressed). Each row is a partial product of the multiplicand and one of the bits of the multiplier. The final product is generated by adding the partial products.

In FIG. 4A, parallelogram 400 is subdivided into sixteen sub-parallelograms 401-416, each of which represents a partial product for a multiplication of a 14-bit multiplicand by a 14-bit multiplier. If the sixteen sub-products represented by sub-parallelograms 401-416 are computed and the respective results added with appropriate offsets, the 56-by-56 product can be determined. (A similar procedure for computing a 54-by-56 product using eight sub-products was described in above-referenced application Ser. No. 11/359,353.)

In one embodiment, the addition of sub-products is advantageously performed in stages, as shown in FIG. 4B. First a sub-product from each pair of adjacent sub-parallelograms within a row (e.g., sub-parallelograms 401 and 402) is computed. For instance, sub-parallelogram 401 produces a 28-bit sub-product 432 while sub-parallelogram 402 produces a 28-bit sub-product 434. Sub-products 432 and 434 are added with a 14-bit relative offset to produce a 42-bit intermediate product 436. Similarly, sub-parallelogram 403 produces a 28-bit sub-product 442 while sub-parallelogram 404 produces a 28-bit sub-product 444. Sub-products 442 and 444 are added with an 14-bit relative offset to produce a 42-bit intermediate product 446. Thereafter, intermediate products 436 and 446 are added with a 28-bit relative offset to produce a 70-bit "iteration result" 450 that represents the multiplication of the 56-bit multiplicand by the 14 least significant bits of the multiplier.

This procedure can be repeated for sub-parallelograms 405-408, 409-412 and 413-416, and the four iteration results can be added together with appropriate offsets to produce the final product.

Some embodiments of the present invention use four 14×17 multiplier circuits to support various operations listed in FIG. 3. During PI and UFA operations, pairs of the multiplier circuits are used together to compute products $M1*\mu 1$ and $M2*\mu 2$ of Eq. 3, with two multiplier circuits being used to compute each product. During DMUL operations, all four multiplier circuits are used together to compute the products iteration results represented in FIGS. 4A and 4B. The multiplier (e.g., operand $\beta$) is subdivided into four sections ($\beta_0$, $\beta_1$, $\beta_2$, $\beta_3$) of 14 bits each; for fp64, the leading three bits in section $\beta_3$ are set to zero since the mantissa has only 53 bits. The multiplicand (e.g., operand $\alpha$) is subdivided into four sections ($\alpha_{H0}$, $\alpha_{H1}$, $\alpha_{L0}$, $\alpha_{L1}$) of 14 bits each; for fp64, the leading bits in section $\alpha_{H0}$ are set to zero. On each of four successive iterations i (where i=0, 1, 2, 3), two of the four 14×17 multipliers are used to multiply $\alpha_{H0}*\beta_i$ and $\alpha_{H1}*\beta_i$ respectively. (Since $\beta_i$ is 14 bits rather than 17 bits, three leading zeroes are advantageously introduced, and each multiplier produces a 31-bit sub-product rather than the 28-bit sub-product shown in FIG. 4B.) The results are added with a 14-bit relative offset to produce a 45-bit intermediate product $\alpha_H*\beta_i$. In parallel, the other two of the 14×17 multipliers are used to multiply $\alpha_{L0}*\beta_i$ and $\alpha_{L1}*\beta_i$ respectively. The results are added with a 14-bit relative offset to produce a 45-bit intermediate product $\alpha_L*\beta_i$. Thus, at each cycle, two 45-bit intermediate products are produced, with a 28-bit offset relative to each other (since $\alpha_L$ is 28 bits). The intermediate products are accumulated in a running sum until the complete product is formed.

During DMUL operations, the addition block used in computing Eq. 3 for UFA and PI operations is advantageously leveraged as an accumulator. On each iteration, the addition block adds the two new intermediate products (with appropriate offsets) to a running total until the complete product is generated. FIGS. 5A-5D illustrate stages in the DMUL accumulation process.

Figure 5A:
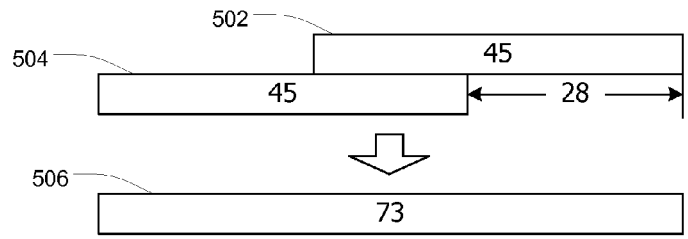
FIGS. 5A-5D illustrate an operating principle of the present invention related to an accumulation process for double-precision multiplication.

More specifically, in FIG. 5A, bit field 502 represents the sub-product $\alpha_L*\beta_0$ (corresponding to sub-parallelogram 401 in FIG. 4A), and bit field 504 represents the sub-product $\alpha_H*\beta_0$ (corresponding to sub-parallelogram 402). The sum of bit fields 502 and 504 is represented as a 73-bit first-iteration running sum field 506. It should be noted that because of the 28-bit relative offset, only 17 of the 73 bits require actual addition.

Figure 5B:
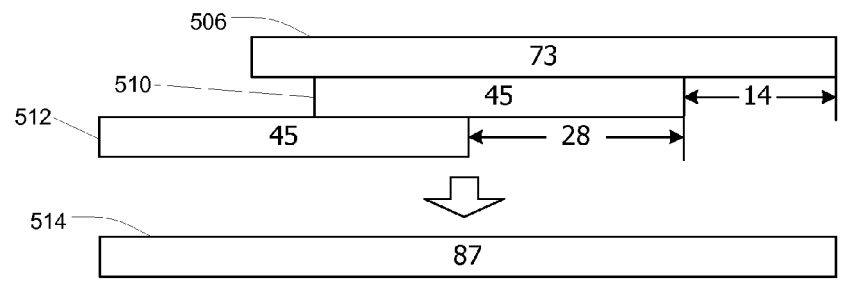

In FIG. 5B, bit field 508 represents the sub-product $\alpha_L*\beta_1$ (corresponding to sub-parallelogram 403 in FIG. 4), and bit field 510 represents the sub-product $\alpha_H*\beta_1$ (corresponding to sub-parallelogram 404 in FIG. 4). The sum of first-iteration running sum field 506 with the new sub-products 508 and 504 is represented as an 87-bit second-iteration running sum field 512. The 14-bit relative offset between fields 506 and 510 corresponds to the offset between $\beta_0$ and $\beta_1$. Because of the various offsets, only 59 of the 87 bits require actual addition.

Figure 5C:
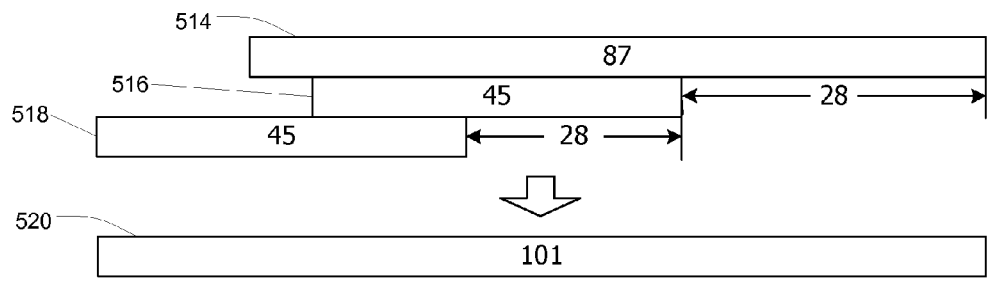

In FIG. 5C, bit field 516 represents the sub-product $\alpha_L*\beta_2$ (corresponding to sub-parallelogram 405) and bit field 518 represents the sub-product $\alpha_H*\beta_2$ (corresponding to sub-parallelogram 406). The sum of second-iteration running sum field 514 with the new sub-products 516 and 518 is represented as a 101-bit third-iteration running sum field 520. The 28-bit relative offset between fields 514 and 516 corresponds to the offset between $\beta_0$ and $\beta_2$. Because of the various offsets, only 59 of the 101 bits require actual addition.

Figure 5D:
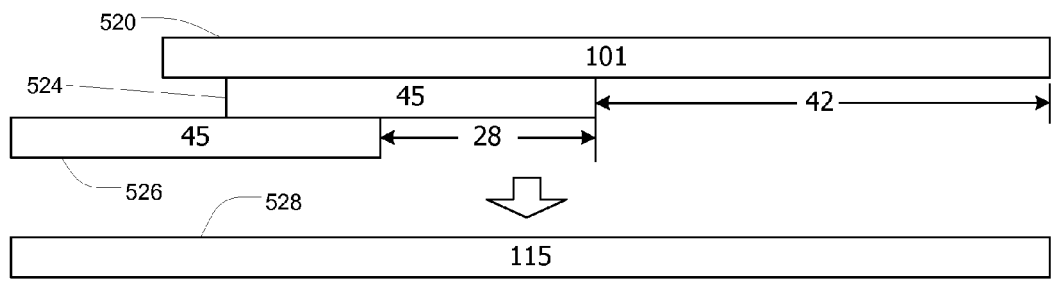

In FIG. 5D, bit field 524 represents the sub-product $\alpha_L*\beta_3$ (corresponding to sub-parallelogram 407) and bit field 526 represents the sub-product $\alpha_H*\beta_3$ (corresponding to sub-parallelogram 408). The sum of third-iteration running sum field 520 with the new sub-products 524 and 526 is represented as a 115-bit fourth-iteration running sum (final result) field 528. The 42-bit relative offset between fields 520 and 524 corresponds to the offset between $\beta_0$ and $\beta_3$. Because of the various offsets, only 59 of the 115 bits require actual addition.

It should also be noted that it is not necessary to preserve (or even to compute) all 115 bits of final result 528. In the case of fp64, the mantissa is 53 bits and trailing bits will be discarded after rounding. In some embodiments, after each iteration, the result is truncated by reducing the last 14 bits to a single sticky bit, e.g., using a conventional OR-reduction, leaving 54 bits plus a guard bit to be used in rounding. In such embodiments, a 73-bit adder is sufficiently wide to accommodate all of the addition operations depicted in FIGS. 5A-5D.

During FILT operations, each of the four 14×17 multipliers is used to compute one of the four component products $A_0*w_0$, $A_1*w_1$, $B_0*w_2$, and $B_1*w_3$. Pairs of the component products are added with appropriate alignment to compute two multiplier terms $P2=A_0*w_0+A_1*w_1$ and $P1=B_0*w_2+B_1*w_3$. These terms can be added to the accumulator operand C using the same circuits used to perform the additions in Eq. 3 above.

Sections II and III describe a MAF unit 220, with Section II describing a circuit structure for MAF unit 220, and Section III describing how that circuit structure can be used to execute the operations listed in FIG. 3. It is to be understood that the MAF unit 220 described herein is illustrative and that other or different combinations of functions might be supported using appropriate combinations of circuit blocks.

II. Example MAF Unit Structure

Figure 6A:
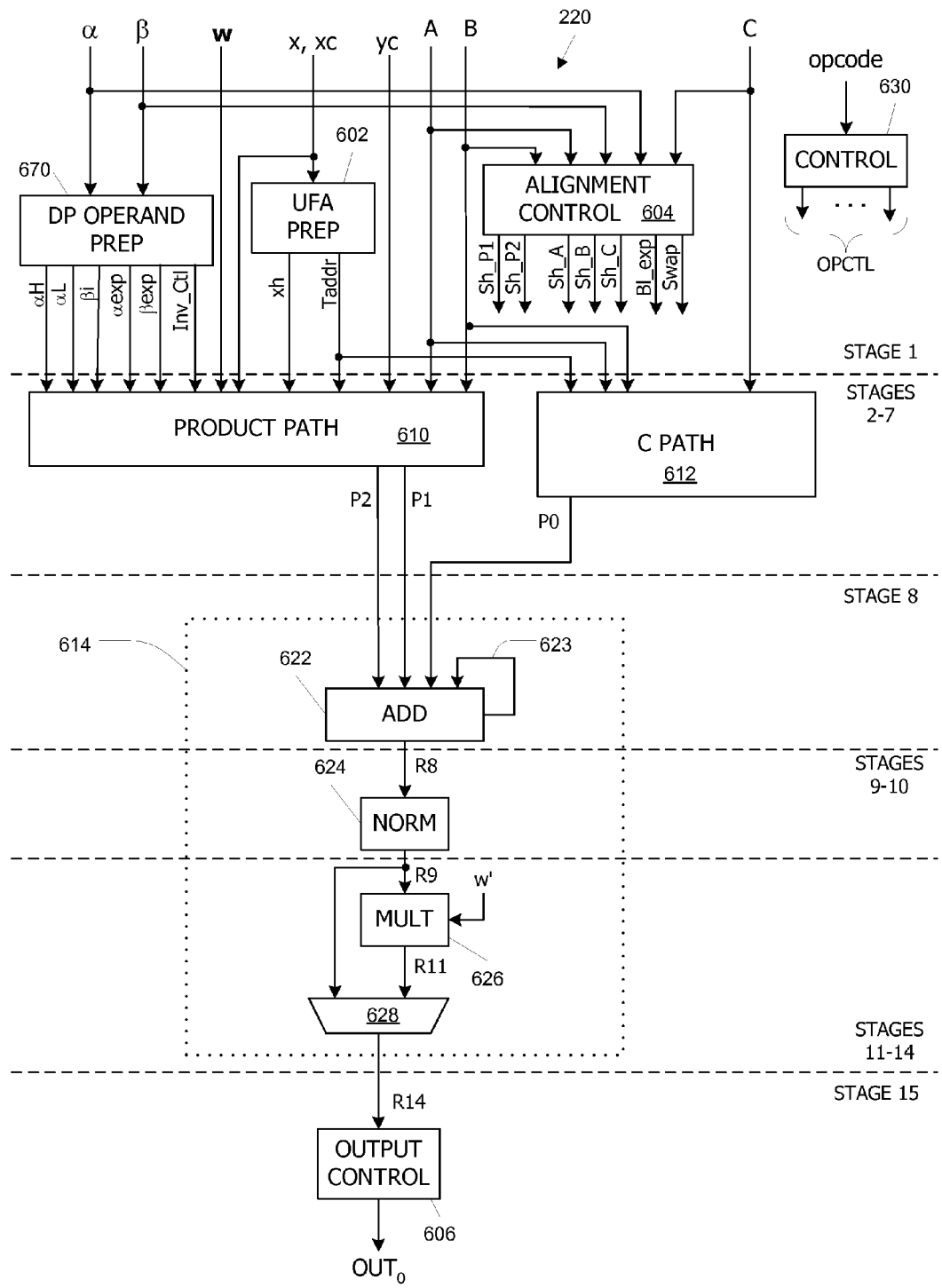
FIG. 6A is a high-level block diagram of a multipurpose arithmetic functional unit according to an embodiment of the present invention.

FIG. 6A is a high-level block diagram of a MAF unit 220 according to an embodiment of the present invention. In this embodiment, MAF unit 220 implements a fifteen-stage pipeline that is used for all operations. On each processor cycle, MAF unit 220 can receive (e.g., from issue circuit 204 of FIG. 2) an opcode and appropriate operands. For a unary function, operand x is provided in a reduced format (see FIG. 3) that includes 24 bits. For a planar interpolation function, operands (x, y), are provided in s13 format, and operands A, B, C are provided in fp32 format. For a double-precision arithmetic function, operands $\alpha$ and $\beta$ are provided in fp64 format. For a linear filter operation, two fp16 coefficient operands $A_0$ and $A_1$ are provided on the 32-bit operand A path, two more fp16 coefficient operands $B_0$ and $B_1$ on the 32-bit operand B path, and fp32 accumulator operand C on the 32-bit operand C path. The coordinate operands $w_0$, $w_1$, $w_2$ and $w_3$ operands are provided in s13 format as a vector w on another path. In some embodiments, the x and y operand paths may be leveraged to supply some or all of the components of vector w.

MAF unit 220 processes each operation through all of the pipeline stages 1-15 and produces a result value (OUT) that is propagated to data transfer path 226 (FIG. 2). Data transfer path 226 may propagate results to register file 224 as shown in FIG. 2 and/or to other elements of a processor core, depending on the architecture. In one embodiment, each stage corresponds to a processor cycle; in other embodiments, elements shown in one stage may be split across multiple processor cycles or elements from two (or more) stages may be combined into one processor cycle. As described below, double-precision arithmetic entails multiple iterations through some of the pipeline stages.

In some embodiments, MAF unit 220 may have multiple output paths capable of providing multiple outputs in parallel. One such embodiment is described in above-referenced application Ser. No. 11/359,353.

Section II.A provides an overview of the MAF pipeline, and Sections II.B-G describe the circuit blocks of each stage in detail.

A. MAF Pipeline

In MAF unit 220 as shown in FIG. 6A, pipeline stage 1 can be regarded as an input section and stage 15 as an output section. Stage 1 includes a unary function approximation (UFA) operand preparation block 602 that, for unary functions, separates operand x into index bits ($x_b$) and offset bits ($x_h$) as described below. Stage 1 also includes an alignment logic block 604 that generates alignment signals (including Sh_P1, Sh_P2, Sh_A, Sh_B, Sh_C, Bl_exp and Swap) used to align values that are to be added, as described below. Stage 1 also includes a double-precision (DP) operand preparation block 670 that, for double-precision arithmetic operations (DADD and DMUL), separates the operands into mantissa and exponent parts and delivers these parts to the product path as described below.

Stage 15 includes an output control block 606 that formats the final result for distribution. Output control block 606 includes control logic for generating special number outputs in the event of overflows, underflows, or special number inputs.

Between stages 1 and 15, MAF unit 220 includes a "product path" 610, a "C path" 612 for handling operand C, and an "addition path" 614 (dotted box). While these names may suggest particular functions, it will become apparent that circuit blocks along the various paths can be leveraged for different purposes depending on the operation being performed.

Figure 6B:
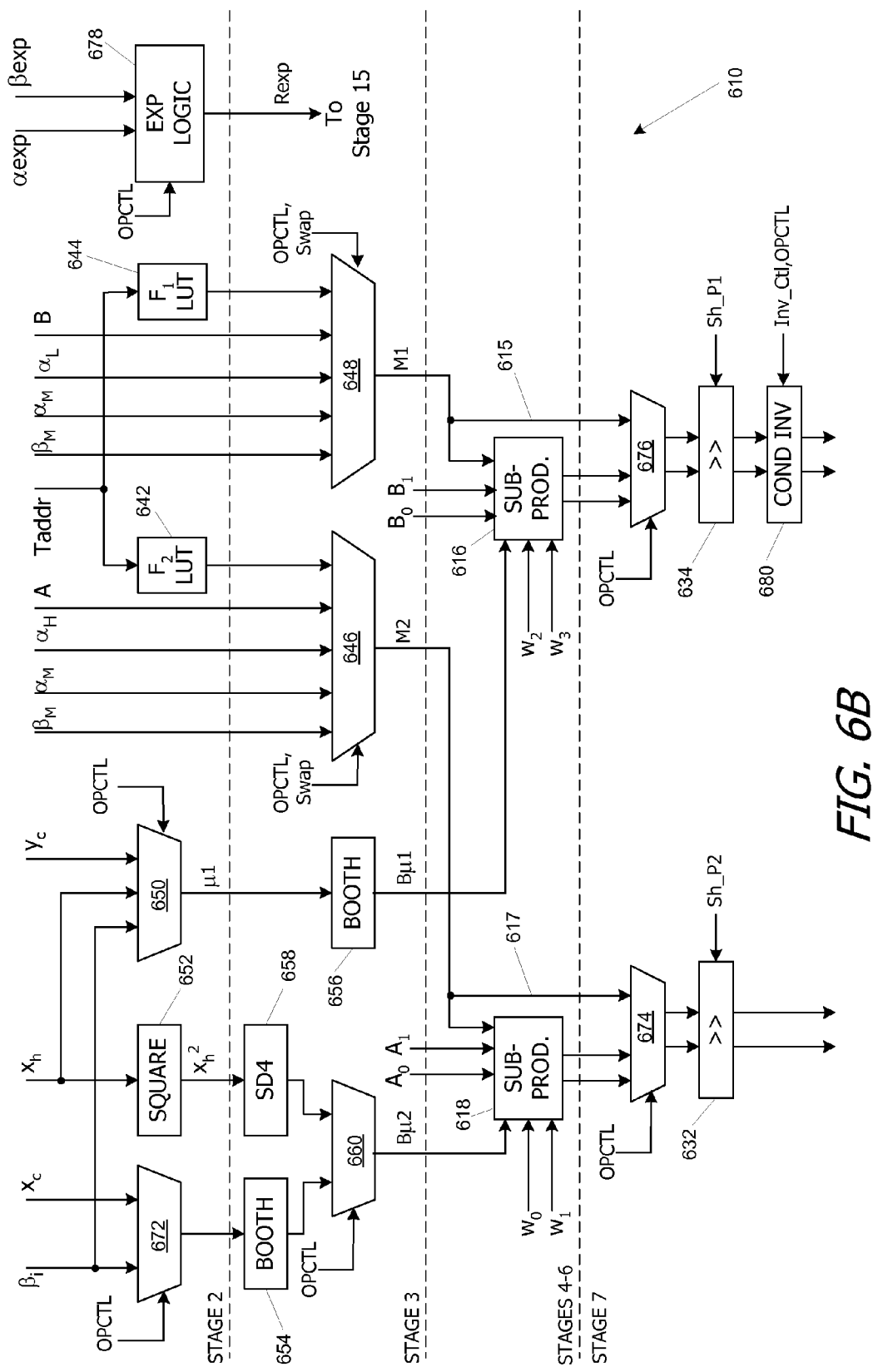
FIG. 6B is a block diagram of a product path for the multipurpose arithmetic functional unit of FIG. 6A.

FIG. 6B is a block diagram of product path 610, also referred to herein as a multiplication pipeline or product pipeline, according to an embodiment of the present invention. FIG. 6B illustrates components used for UFA, PI and double-precision operations. Additional components of product path 610 used for FILT operations are described below with reference to FIG. 8.

Figure 8:
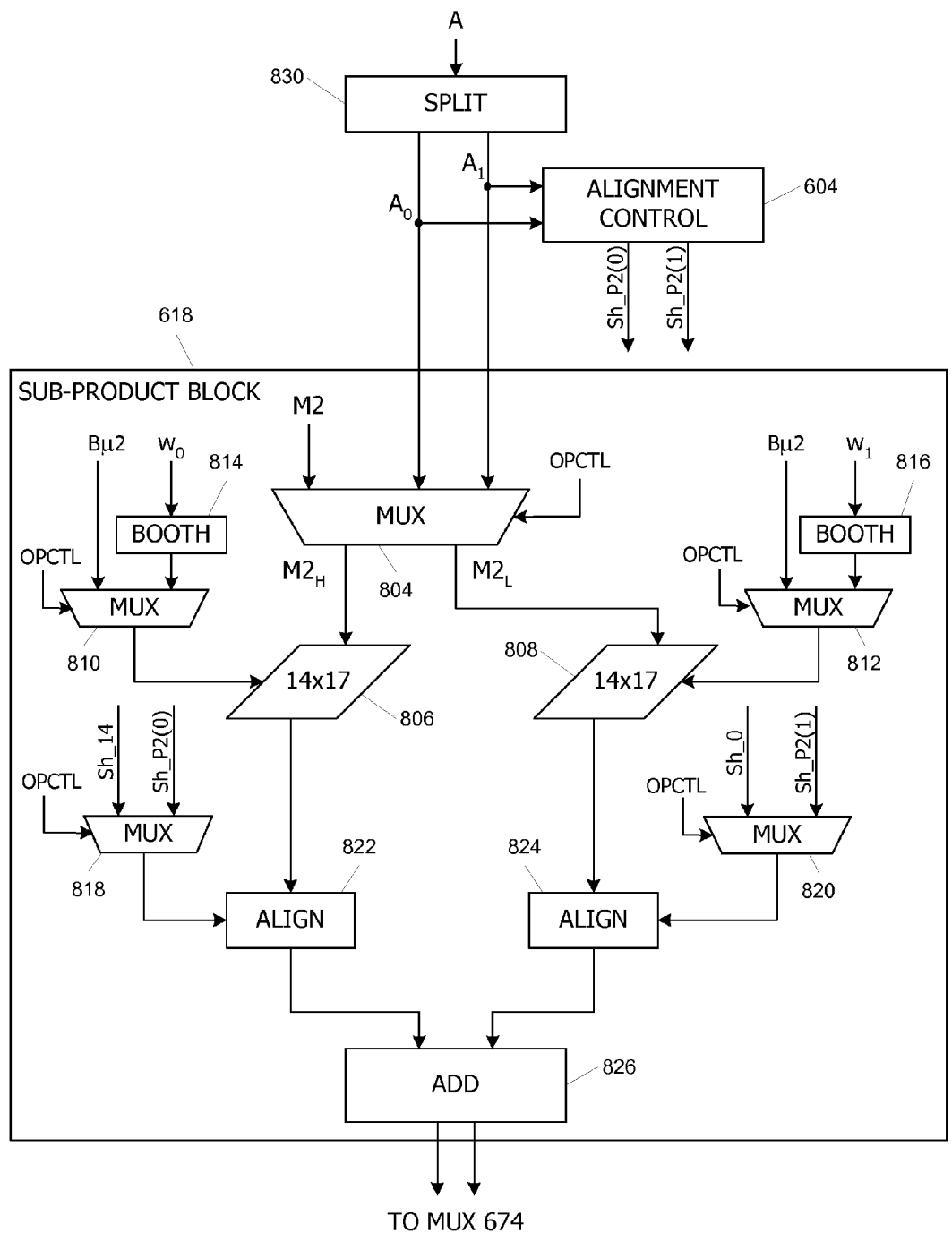
FIG. 8 is a block diagram showing a sub-product block in the multipurpose arithmetic functional unit of FIG. 6A.

As shown in FIG. 6B, product path 610 includes two "sub-product" blocks 616, 618 for computing products $P1=M1*\mu1$ and $P2=M2*\mu2$ (in the generalized notation of Eq. 3). Each of sub-product blocks 616 and 618 can be implemented using a pair of 14×17 multipliers as shown in FIG. 8 and described below. Product path 610 also includes selection circuitry for selecting and encoding an appropriate multiplier (μ) and multiplicand (M) for each sub-product based on the operation. Specifically, for PI operations, M2=A, μ2=x, M1=B, and μ1=y. For UFA operations, M2=$F_2(x_b)$, μ2=$x_h^2$, M1=$F_1(x_b)$, and μ1=$x_h$, where $x_b$ and $x_h$ are derived from operand x by UFA preparation block 602. For DMUL operations, M2=$α_H$ (the 26 most significant bits (MSBs) of the mantissa of operand α, with a leading 0 prepended), M1=$α_L$ (the 27 least significant bits (LSBs) of the mantissa of operand α), and μ2=μ1=$β_i$ (14 bits from the mantissa of operand β, selected sequentially as described below). For DADD operations, M2 is the mantissa of the larger one of operands α and β, as determined by alignment logic block 604, while M1 is the mantissa of the smaller operand. For FILT operations, sub-product block 618 computes $A_0*w_0+A_1*w_1$ while sub-product block 616 computes $B_0*w_2+B_1*w_3$, in accordance with Eqs. 5a and 5b. In other embodiments, different permutations of the multipliers and multiplicands may be selected; for example, the multiplier and multiplicand for an operation might be reversed. The components of product path 610 are described further in Section II.C.

Figure 6C:
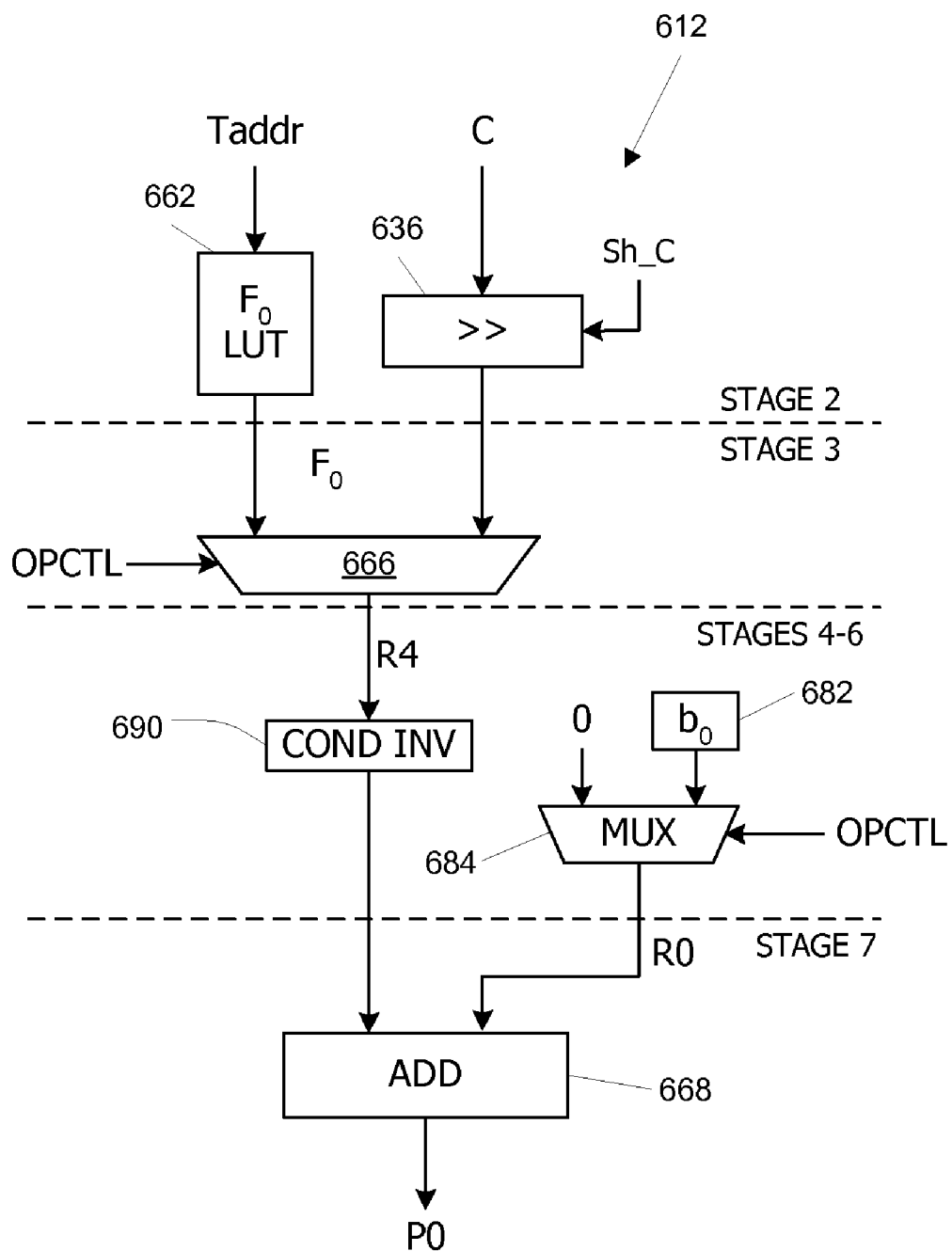
FIG. 6C is a block diagram of a C path, or offset path, for the multipurpose arithmetic functional unit of FIG. 6A.

FIG. 6C is a block diagram of operand C path 612, also referred to herein as an offset path or offset pipeline, according to an embodiment of the present invention. In some embodiments, C path 612 includes an adder 668 that is used during a UFA operation to compute a coefficient P0=$F_0(x_b)$+ $b_0$, where $b_0$ is a function-specific rounding bias as described in above-referenced application Ser. No. 10/861,184. In some embodiments, the rounding bias $b_0$ may be omitted. C path 612 supplies a P0 value to addition path 614. The components of C path 612 are described further in Section II.D.

Addition path 614 (dotted box in FIG. 6A), also referred to herein as an addition pipeline, includes an add block 622, a normalization block 624, and a multiply block 626. The addition pipeline receives the products P1 and P2 from product path 610 and a P0 value from C path 612. Add block 622 computes a sum P2+P1+P0 during stages 7 and 8, producing a result R8. Add block 622 is also operable in an accumulation mode during DMUL operations, as described below.

Normalization block 624 normalizes the result R8 in stages 9 and 10, producing a result R9. In stages 11-14, multiplier block 626 may be used to apply perspective correction by multiplying the result R9 by the interpolated perspective parameter w', or block 626 may be bypassed via a multiplexer 628 if perspective correction is not desired.

In some embodiments, operand C path 612 may include a "delta" block, e.g., as described in above-referenced application Ser. No. 11/359,353, that computes values related to multiple sampling location offsets during PI operations. The pipeline of addition path 614 may be replicated as desired to compute an output value using each sampling location in parallel. These features, described in detail in above-referenced application Ser. No. 11/359,353, are omitted herein as not being critical to understanding the present invention.

In addition to these data paths, MAF unit 220 also provides a control path, represented in FIG. 6A by a control block 630 in stage 0. Control block 630 receives the opcode and generates various opcode-dependent control signals, denoted generally herein as "OPCTL," that can be propagated to each circuit block in synchronization with data propagation through the pipeline. (The connection of OPCTL signals into certain circuit blocks has been omitted from the drawings for clarity.) As described below, OPCTL signals can be used to enable, disable, and otherwise control the operation of various circuit blocks of MAF unit 220 in response to the opcode so that different operations can be performed using the same pipeline elements. The various OPCTL signals referred to herein can include the opcode itself or some other signal derived from the opcode, e.g., by combinatorial logic implemented in control block 630. In some embodiments, control block 630 may be implemented using multiple circuit blocks in several pipeline stages. It is to be understood that the OPCTL signals provided to different blocks during a given operation may be the same signal or different signals. In view of the present disclosure, persons of ordinary skill in the art will be able to construct suitable OPCTL signals.

It should be noted that the circuit blocks for a given stage may require different amounts of processing time and that the time required at a particular stage might vary from one operation to another. Accordingly, MAF unit 220 may also include various timing and synchronization circuits (not explicitly shown) to control propagation of data on different paths from one pipeline stage to the next. Any appropriate timing circuitry (e.g., latches, transmission gates, etc.) may be used.

B. Elements in Stage 1

Pipeline stage 1 includes UFA preparation block 602, alignment control block 604, and DP preparation block 670.

Figure 7A:
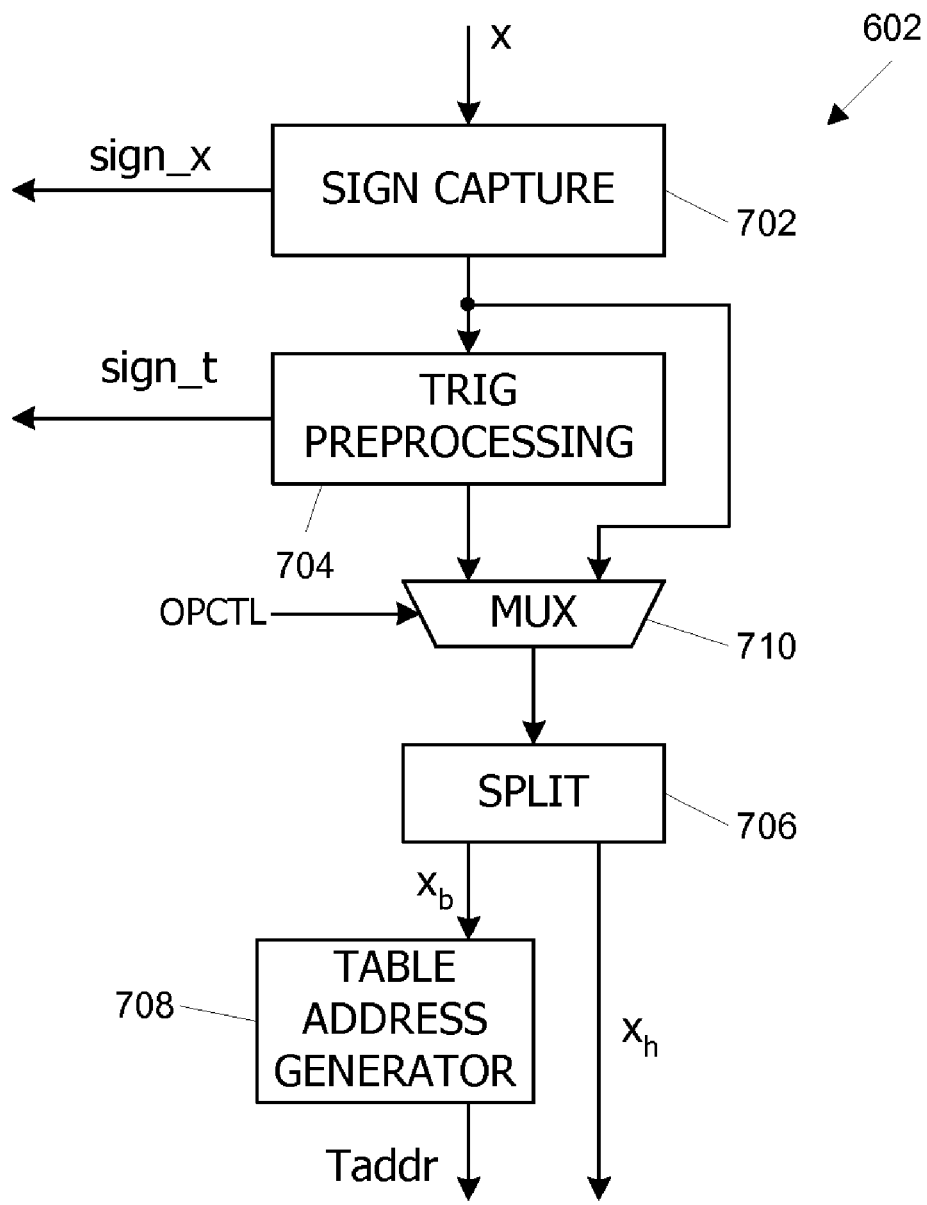
FIG. 7A is a block diagram of an operand preparation block for unary function approximation operations in the multipurpose arithmetic functional unit of FIG. 6A.

FIG. 7A is a block diagram of UFA preparation block 602, which includes a sign capture block 702, a trig preprocessing circuit 704, a splitting circuit 706, a table address generator 708, and selection multiplexer (mux) 710. For UFA operations, UFA preparation block 602 generates an index for lookup tables that can be used to extract the coefficients $F_2$, $F_1$, $F_0$ (see Eq. 1 above) and an offset value $x_h$. Specifically, sign capture block 702 extracts the sign bit (e.g., the first bit) of operand x and generates a corresponding sign_x signal that is advantageously provided to downstream components for which sign information is required, notably output control blocks 606 in stage 15 (FIG. 6).

Splitting circuit 706 receives an operand x that has 24 mantissa bits (the implied leading 1 can be inserted for fp32 inputs as appropriate) and separates the mantissa bits into m MSBs ($x_b$) and 24-m LSBs ($x_h$). The value of m may be controlled so that different values are used for different unary functions. The MSBs ($x_b$) correspond to a baseline value for the polynomial approximation of Eq. 1 above, and the LSBs ($x_h$) correspond to the offset. As described above, MAF unit 220 advantageously operates on reduced arguments. Except in the case of logarithm operations (described below), exponent bits in operand x are not relevant.

Table address generation circuit 708 uses the baseline value $x_b$ to determine a table address (Taddr) for coefficient lookup tables. In one embodiment, a physically separate lookup table is provided for each supported unary function, and table address Taddr may be just $x_b$. In other embodiments, some or all of the lookup tables are physically combined but logically separate, and Taddr is computed based on the opcode as well as $x_b$ (e.g., by adding an opcode-dependent offset to the baseline value $x_b$). In one embodiment, the lookup tables are implemented such that one address Taddr returns all three coefficients $F_2$, $F_1$, $F_0$ for a function; in other embodiments, table address generation circuit 708 may be configured to provide a different address Taddr for each coefficient.

In some embodiments, UFA preparation block 602 also includes trig preprocessing circuit 704, which performs further operand processing in the case of trigonometric UFA operations (e.g., sine and cosine) and is bypassed by selection mux 710 for all other functions. Specifically, trig preprocessing circuit 704 performs a "quadrant reduction" on operand x. As noted above, for SIN and COS operations, the operand is advantageously provided as a fraction $x_R$ in the interval [0, 1).

As is well known, sine and cosine functions have a quadrant symmetry such that sin x=sin(π–x), cos x=–cos(π–x), and so on. Thus, if $x_R$ is not in the first quadrant (i.e., range [0, ¼]), sin x or cos x can be computed by determining the sine or cosine of either x or an appropriate supplement of x that is in the first quadrant and choosing the correct sign based on the quadrant of $x_R$. The quadrant of $x_R$ can be determined by examining the two leading bits of the fraction and an appropriate transformation applied, based on the quadrant and whether sine or cosine is being computed. The appropriate sign for the result, which is determined from the quadrant, is propagated on a sign_t signal line. Suitable trig preprocessing circuits are known in the art.

Referring again to FIG. 6A, alignment control block 604 determines the relative alignment for the terms P0, P1, P2. In the case of UFA operations, coefficients $F_2$, $F_1$, $F_0$ are all represented as fixed-point numbers, but operand x is generally a floating-point number with a nonzero exponent, which may require applying a nonzero shift in P2 and/or P1 due to the effect of squaring $x_h$. Alignment control block 604 generates suitable control signals Sh_P2 and Sh_P1 that are applied by shift circuits 632 and 634 at the end of product path 610.

In the case of PI operations, coordinates x and y are in a fixed-point format, but interpolation parameters A, B, and C are in a floating-point format (e.g., fp32) and may have different orders of magnitude; consequently, alignment shifting of any two of P2, P1, and P0 prior to addition may be needed. Alignment control block 604 generates suitable control signals Sh_P2 and Sh_P1 that are applied by shift circuits 632 and 634 at the end of product path 610 and also generates a control signal Sh_C that is applied to parameter C by shift circuit 636 in pixel offset path 612. Further, the pixel offset computations in delta block 620 may also require alignment shifting; this alignment is achieved by shifting parameters A and B using shift circuits 638, 640 in pixel offset path 612, under the control of Sh_A and Sh_B signals generated by alignment control block 604. Conventional techniques (e.g., exponent comparison) for determining alignment shift amounts may be used.

In some embodiments, alignment shift amounts for planar interpolation operations may be determined upstream of MAF unit 220. For example, in the case of fragment attributes in graphics applications, it is often the case that the same interpolation parameters A, B, C apply to multiple fragments. For efficiency, the shift amounts can be computed elsewhere (e.g., in the same module that generates parameters A, B, C for the attribute) and provided as inputs to MAF unit 220 along with operands A, B, and C.

Alignment control block 604 also determines the relative alignment of the operands for double-precision addition (DADD) operations. In one embodiment, alignment control block 604 subtracts the respective 11-bit exponents of double-precision operands α and β. The sign of the difference is used to identify the larger of the two exponents, which is supplied as a block exponent (Bl_exp) to subsequent stages as described below. The sign of the difference is also used to generate a swap control (Swap) signal that is used to steer operands α and β onto appropriate paths as described below. The magnitude of the difference is provided as shift control signal Shift_P1.

For double-precision multiplication (DMUL) operations, alignment control block 604 sets the Sh_P2 control signal to zero and the Sh_P1 control signal to 27, to provide a 27-bit relative offset between the sub-products generated in each iteration.

Operation of alignment control block 604 during FILT operations is described below with reference to FIG. 8.

Figure 7B:
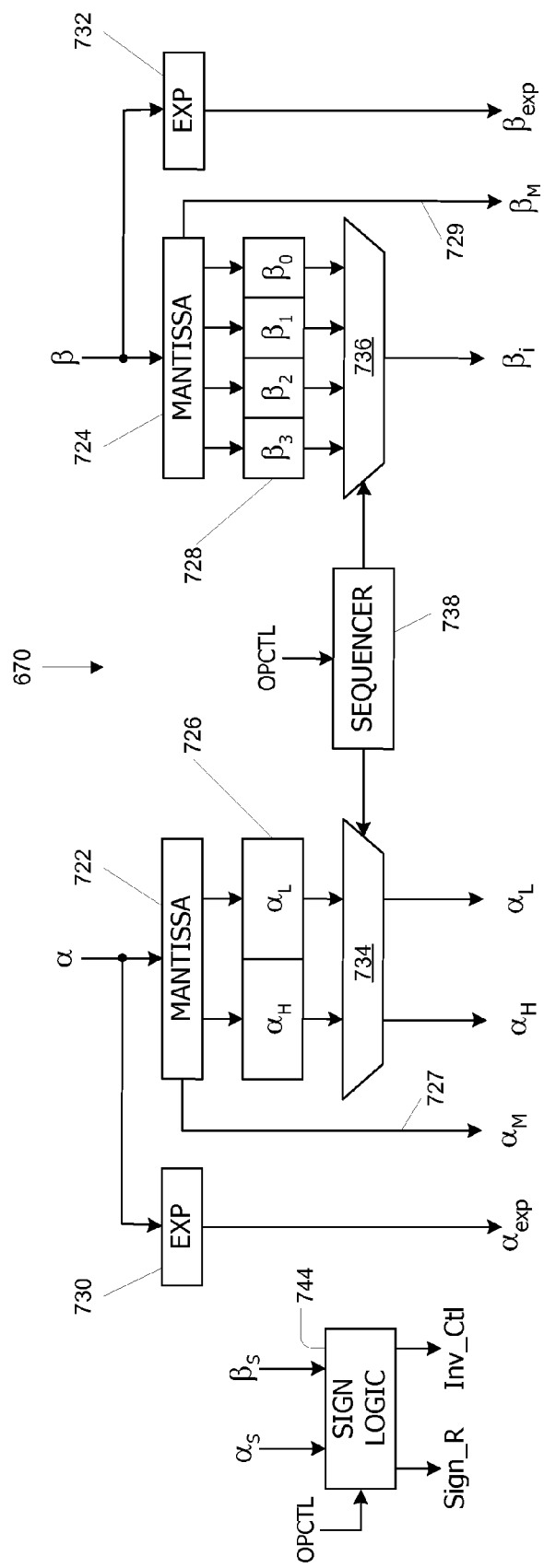
FIG. 7B is a block diagram of an operand preparation block for double-precision arithmetic operations in the multipurpose arithmetic functional unit of FIG. 6A.

FIG. 7B is a block diagram of DP preparation block 670 according to an embodiment of the present invention. DP preparation block 670 prepares fp64 operands α and β for DMUL operations. More specifically, mantissa extractors 722 and 724 extract the 52 significand bits from operands α and β, respectively, add a leading 1 to create 53-bit mantissas ($α_M$ and $β_M$), and write the resulting mantissas to registers 726 and 728, respectively. Mantissa extractors also deliver the 53-bit mantissas $α_M$ and $β_M$ via paths 727 and 729 to product path 610 for use in DADD operations. Exponent extractors 730 and 732 extract and deliver the respective 11-bit exponents (αexp and βexp) of operands α and β to product path 610 of FIG. 6A.

In one embodiment, registers 726 and 728 are segmented, and mantissa bits are read out through selection muxes 734, 736 operating under control of a sequencer circuit 738, which is responsive to an OPCTL signal indicating whether the currently selected operation is a DMUL operation. For DMUL operations, sequencer circuit 738 controls selection mux 736 to select multiplier portions $β_0$, $β_1$, $β_2$, and $β_3$ sequentially, e.g., on four successive cycles. In parallel, sequencer circuit 738 controls selection mux 734 to read out multiplicand portions $α_H$ and $α_L$ in parallel four times. These values are delivered to the multipliers in product path 610 as described below.

DP preparation block 670 also includes a sign logic circuit 744. For DMUL operations, the sign logic circuit determines a sign bit (Sign_R) for the product based on the respective sign bits ($α_S$ and $β_S$) of the operands α and β and provides this sign bit to output control unit 606 at stage 15. For DADD operations, sign logic circuit 744 determines whether the operation entails subtraction, which is performed by inverting the mantissa of the smaller operand and adding, and provides a corresponding control signal (Inv_Ctl) to a conditional inverter in product path 610. Sign logic circuit 744 may be of generally conventional design. The mantissa path provides the complete (53-bit) mantissas of operands α and β to product path 610 during DADD operations.

C. Elements in Product Path

Product path 610 is shown in FIG. 6B and FIG. 8. In addition to sub-product blocks 616, 618 and shift circuits 632, 634 referred to above, product path 610 as shown in FIG. 6B includes lookup tables 642, 644 that provide UFA coefficients $F_2$, $F_1$, respectively; multiplicand (M1, M2) selection muxes 646, 648; a μ1 selection mux 650; a squaring circuit 652; Booth encoders 654, 656; an SD4 recoder 658; and a μ2 selection mux 660. These additional circuits operate to generate and select appropriate inputs to sub-product blocks 616, 618 for both UFA and PI operations.

FIG. 8 is a block diagram showing additional features of sub-product block 618 according to an embodiment of the present invention. As shown in FIG. 8, sub-product block 618 includes a multiplicand distribution mux 804; two 14×17 multiplier circuits 806, 808; two multiplier selection muxes 810, 812; Booth encoders 814, 816; alignment selection muxes 818, 820; alignment circuits 822, 824; and adder 826. It is to be understood that sub-product block 616 of FIG. 6B (not explicitly shown) may include corresponding components.

Also shown in FIG. 8 are a splitter circuit 830 and aspects of alignment control circuit 604 of FIG. 6A that are specifically relevant to FILT operations. These circuits may be included at stage 1 of the pipeline of FIG. 6A. Splitter circuit 830 is responsive to an OPCTL signal; during a FILT operation, splitter circuit 830 splits operand A into two fp16 operands $A_0$ and $A_1$. The mantissa portions of these operands are delivered to product path 610, and the exponent portions are delivered to alignment control block 604. During a FILT operation, alignment control block 604 uses the exponent portions of operands $A_0$ and $A_1$ to determine the relative alignment of the products $A_0*w_0$ and $A_1*w_1$ that will be computed by sub-product block 618 and generates corresponding control signals Sh_P2(0) and Sh_P2(1).

A corresponding splitter circuit can be provided to separate operand B into two fp16 operands $B_0$ and $B_1$, with the mantissa portions being delivered to product path 610 and exponent portions to alignment control block 604, which advantageously generates control signals Sh_P1(0) and Sh_P1(1) (not explicitly shown) reflecting the relative alignment of the products $B_0*w_2$ and $B_1*w_3$ that will be computed by sub-product block 616.

1. Product P2

Product P2 (i.e., M2*μ2 in the notation of Eq. 3) corresponds to $F_2(x_b)*x_h^2$ for UFA operations and to A*x for PI operations. For DMUL operations, the sub-product block 618 that generates product P2 is used to compute the sub-product $\alpha_H*\beta_i$. For FILT operations, sub-product block 618 is used to generate $P2=A_0*w_0+A_1*w_1$.

Referring to FIG. 6B, to generate multiplicand M2, table address Taddr from UFA preparation block 602 is provided to lookup table 642, which returns a corresponding coefficient $F_2$. In one embodiment, the lookup table operation requires all of stage 2 and part of stage 3 to complete. At the end of stage 3, in response to an OPCTL signal, selection mux 646 selects coefficient $F_2$ for UFA operations, operand A for PI operations, or partial mantissa $\alpha_H$ from DP preparation block 670 for DMUL operations. For DADD operations, selection mux 646 is driven by an OPCTL signal in combination with the Swap signal generated by alignment control block 604 (FIG. 6A) and selects the larger of operands α and β. For FILT operations, the operand selected by selection mux 646 is not used, and any of the inputs may be selected.

In parallel, to generate multiplier μ2, operand $x_h$ is provided to a squaring circuit 652. During stage 2, squaring circuit 652, which may be of generally conventional design, squares $x_h$ to generate $x_h^2$. In some embodiments, squaring circuit 652 can be optimized in various ways. For example, in this embodiment, $x_h^2$ is used in approximating a function, and a computation $x_h^2$ with reduced precision (e.g., fewer bits) may be acceptable for this purpose. Where this is the case, one or more LSBs of the input $x_h$ that do not contribute to the reduced precision $x_h^2$ may be dropped, allowing a reduction in the size of squaring circuit 652. Other optimizations exploit the fact that the multiplier and multiplicand are identical operands; consequently, the logic for adding partial products can be simplified as compared to a general purpose multiplier. Such optimizations are known in the art. In parallel, a selection mux 672 is driven by an OPCTL signal to select partial mantissa $\beta_i$ for DMUL operations or operand x for PI operations.

During stage 3, the resulting $x_h^2$ is then recoded into a conventional Booth encoding (e.g., Booth2, radix 4) by sign digit (SD4) recoder 658, which may also be of conventional design; SD4 recoder 658 can convert $x_h$ from a redundant (carry-save) form produced by squaring circuit 652 to Booth-encoded form. In parallel, during stage 3, the one of partial mantissa $\beta_i$ and operand x selected by mux 672 is Booth encoded by Booth encoder 654, which may also be of conventional design. At the end of stage 3, in response to an OPCTL signal, selection mux 660 selects, as Bμ2, Booth-encoded operand $x_h^2$ for UFA operations, Booth-encoded operand x for PI operations, or Booth-encoded partial mantissa $\beta_i$ for DMUL operations. For FILT operations, the Bμ2 operand selected by mux 660 is not used, and either input may be selected. In an alternative embodiment, selection between x, $x_h^2$ and $\beta_i$ might be made before Booth encoding the selected result.

During stages 4-6, sub-product block 618 selects and computes the product of a multiplicand and a multiplier. As shown in FIG. 8, sub-product block 618 includes a selection mux 804 that selects either the multiplicand M2 received from selection mux 646 or the split operand $A_0$, $A_1$. For a FILT operation; the operand pair $A_0$, $A_1$ is selected; for all other operations, M2 is selected. The upper 14 bits of the selected multiplicand (all mantissa bits of operand $A_0$ in the case of a FILT operation) are delivered as multiplicand $M2_H$ to 14×17 multiplier 806 while the lower 14 bits of the selected multiplicand (all mantissa bits of operand $A_1$ in the case of a FILT operation) are delivered as multiplicand $M2_L$ to 14×17 multiplier 808. If the multiplicand is less than 28 bits, the lower 14 bits are included in $M2_L$, and $M2_H$ is padded with leading zeroes.

Operands $w_0$ and $w_1$ are Booth encoded using Booth encoders 814 and 816, respectively. Selection muxes 810 and 812 select the multipliers to be used in multiplier circuits 806 and 808, respectively. For a FILT operation, Booth-encoded operands $w_0$ and $w_1$, respectively, are selected; for all other operations, both muxes 810 and 812 select the multiplier Bμ2.

Those skilled in the art will appreciate that some or all of the multiplier and/or multiplicand selection operations depicted as part of sub-product block 618 may be performed before stage 4 of the pipeline, e.g., during stages 2 and/or 3. The order of multiplicand selection and Booth encoding may be reversed if desired to reduce the number of Booth encoder circuits.

Multiplier circuits 806 and 808 may be of generally conventional design. In one embodiment, each multiplier circuit 806, 808 is a 14×17-bit multiplier circuit that includes a set of Booth multiplexers followed by a suitable carry-save adder (CSA) tree. Multiplier circuits 806 and 808 may produce sub-products in redundant (carry-save) or non-redundant form as desired. For UFA operations, multiplier 808 can operate as a 14×17 multiplier, for PI operations as a 24×13 multiplier, for DMUL operations as a 14×14 multiplier, and for FILT operations as a 14×13 multiplier. For UFA operations, multiplier 806 can operate as a 3×17 multiplier (since $M2=F_2$ for UFA, and $F_2$ is 17 bits), for PI operations as a 10×13 multiplier (since coefficient A has a 24-bit mantissa), for DMUL operations as a 13×14 multiplier (since $\alpha_H$ is 27 bits), and for FILT operations as a 14×13 multiplier.

The products produced by multiplier circuits 806 and 808 are aligned and added. More specifically, in response to an OPCTL signal, selection muxes 818 and 820 each select a shift control signal appropriate to the operation in progress and provide the selected signal as a control signal to a corresponding one of alignment circuits 822 and 824. For FILT operations, the Sh_P2(0) and Sh_P2(1) signals provided by alignment control circuit 604 are selected by muxes 818 and 820, respectively. For all other operations, selection mux 818 selects a Sh__14 signal that causes alignment circuit 822 to left-shift the sub-product from multiplier 806 by 14 bits while selection mux 820 selects a Sh__0 signal that causes the sub-product from multiplier 808 not to be shifted. Alignment circuits 822 and 824 may perform shifting in redundant form as described below or in non-redundant form as desired.

Adder 826, which may also be of generally conventional design, adds the respective results from alignment circuits 822, 824 to produce a final product P2. For UFA and PI operations, P2 corresponds to M2*µ2. For DMUL operations, P2 corresponds to $\alpha_H * \beta_i$. For FILT operations, P2 corresponds to $A_0 * w_0 + A_1 * w_1$.

In some embodiments, the final product P2 is provided in a redundant carry-save form (indicated herein by P2c, P2s); in other embodiments, adder 826 further includes a conventional carry propagation adder (CPA) that combines the carry and save results into a final non-redundant form.

Multiplier circuits 806 and 808 are advantageously configured to handle the different operand formats used for UFA, PI, DMUL and FILT operations. For UFA operations, the operand $x_h^2$ is in a sign-magnitude form while the coefficient $F_2$ (which might be positive or negative) could be stored in either two's complement or sign-magnitude form. For PI operations, coordinate x is in a fixed-point, two's complement form while parameter A has a 24-bit mantissa in sign-magnitude form. For DMUL operations, both operands are in sign-magnitude format. For FILT operations, the operand formats are the same as for PI operations.

In one embodiment, to facilitate handling UFA and PI or FILT operations by the same multiplier, coefficients $F_2, F_1, F_0$ are stored in the lookup tables in two's complement form. Use of the two's complement representation can support a more compact Booth multiplier. For instance, given that $x_h^2$ is unsigned, it follows that in Booth multiplication the final partial product would always be non-complemented (i.e., the Booth algorithm selects either +$F_2$ or 0). If the multiplier is represented in sign-magnitude form, a negative multiplier would require inversion and adding 1 in the LSB. In some instances, this could undesirably extend the height and/or critical path of the multiplier tree. In other embodiment, e.g., where the resulting height of the multiplier tree would be acceptable or where the tree implements a different multiplication algorithm, coefficients $F_2, F_1, F_0$ may be stored in sign-magnitude format.

For PI or FILT operations, the sign bit of parameter A can be provided to the partial product generator and used to invert the sign of the Booth partial products where appropriate. For instance, if the Booth algorithm would normally select –2A, then 2|A| should be chosen in the event that A is less than zero and vice versa. In addition, any zero term is forced to "positive" zero (all zeroes) rather than "negative" zero (all ones). Under these conditions, multiplier circuits 806 and 808 generate correct sign extensions for all partial products and therefore correct results. It is to be understood that the present invention is not limited to particular operand formats or particular multiplier circuit designs.

Referring again to FIG. 6B, a bypass path 617 around sub-product block 618 is advantageously provided. For DADD operations, bypass path 617 is used to bypass the mantissa ($\alpha_M$ or $\beta_M$) of the larger of the operands (selected by mux 646) around sub-product block 618. A selection mux 674 at the output of sub-product block 618 is driven by an OPCTL signal to select the large operand for DADD operations and the product result from sub-product block 618 for all other operations. Where the product is in redundant form at the end of stage 6, the large operand can be propagated in the P2s field with all bits of the P2c field set to zero.

At stage 7, shift circuit 632 applies the right shift indicated by the Sh_P2 control signal as an arithmetic shift to P2. As is known in the art, an arithmetic right shift requires sign extending the bit field, inserting leading zeroes for positive numbers and leading ones for negative numbers. In some embodiments, an arithmetic shift can be applied to P2c and P2s in redundant form. This is done using combinatorial logic based on the respective MSBs of P2c and P2s and the desired sign of the product P2, which is known because the respective signs of the factors M2 and µ2 are known. For example, for n-bit P2s and P2c, suppose that the product is known to be negative, and the MSBs $P2s_{n-1}$ and $P2c_{n-1}$ are both zero. In this case, a negative sign (1) in the nth bit position can be obtained by using the sign extensions $P2s_n=0$ and $P2c_n=1$ (or vice versa). Other cases can be resolved using similar logic. In one embodiment, the sign-extension bit for P2s is set to 1 if the product is negative and to the logical OR of $P2s_{n-1}$ and $P2c_{n-1}$ otherwise, while the sign-extension bit for P2c is set to 0 if the product is non-negative and to the logical AND of $P2s_{n-1}$ and $P2c_{n-1}$ otherwise. Different conventions may also be used. In another embodiment, P2 is in non-redundant form and a conventional arithmetic shift circuit may be used. For DMUL and DADD operations, shift circuit 632 does not right shift the input P2.

The resulting shifted P2 (in redundant or non-redundant form, as desired) is provided to addition path 614. For DMUL and DADD operations, P2 is left-aligned in a 68-bit field.

2. Product P1

Product P1 (M1*µ1) corresponds to $F_1(x_b)*x_h$ for unary functions and to B*y for planar interpolation. For DMUL operations, the sub-product block 616 that generates product P1 is used to compute the sub-product $\alpha_L * \beta_i$. For FILT operations, sub-product block 616 is used to generate P1=$B_0 * w_2 + B_1 * w_3$.

Referring to FIG. 6B, to generate multiplicand M1, table address Taddr from UFA preparation block 602 is provided to lookup table 644, which returns a corresponding coefficient $F_1$. In one embodiment, the lookup table operation requires all of stage 2 and part of stage 3 to complete. At the end of stage 3, in response to an OPCTL signal, selection mux 648 selects coefficient $F_1$ for UFA operations, operand B for PI operations, or partial mantissa $\alpha_L$ from DP preparation block 670 for DMUL operations. For DADD operations, selection mux 648 is driven by an OPCTL signal in combination with the Swap signal generated by alignment control block 604 (FIG. 6A) and selects the mantissa ($\beta_M$ or $\alpha_M$) of the smaller of operands α and β.

In parallel, to generate multiplier µ1, during stage 2, µ1 selection mux 650 is driven by an OPCTL signal to select operand $x_h$ for unary functions, operand y for planar interpolation operations, or partial mantissa $\beta_i$ for DMUL operations. During stage 3, the selected operand µ1 is Booth encoded to produce a multiplier Bµ1.

During stages 4-6, sub-product block 616 selects and computes the product of a multiplicand and a multiplier. Sub-product block 616 may be of similar design to sub-product block 618 of FIG. 8, with operands µ1, $w_2$ and $w_3$ in place of operands n2, $w_0$ and $w_1$, respectively; operands M1 and B (which splits to fp16 operands $B_0$ and $B_1$ for a FILT operation) in place of operands M2 and A, respectively; and other components modified accordingly. Alignment and adding are advantageously performed using circuits corresponding to selection muxes 818 and 820, alignment circuits 822 and 824, and adder circuit 826. Like sub-product block 618, sub-product block 616 may provide the final product in a redundant (carry-save) form as results P1c and P1s. In other embodiments, sub-product blocks 616 and 618 each include a conventional carry propagation adder (CPA) that combines the carry and save results into a final non-redundant form.

Referring to FIG. 6B, a bypass path 615 around sub-product block 616 is advantageously provided. For DADD operations, bypass path 615 is used to bypass the mantissa ($\beta_M$ or $\alpha_M$) of the smaller of the operands (selected by mux 648) around sub-product block 616. A selection mux 676 at the output of sub-product block 616 is driven by an OPCTL signal to select the small operand for DADD operations and the product result from sub-product block 616 for all other operations. Where the product is in redundant form at the end of stage 6, operand β can be propagated in the P1s field with all bits of the P1c field set to zero.

At stage 7, shift circuit 634 applies the right shift indicated by the Sh_P1 control signal as an arithmetic shift to P1, similarly to shift circuit 632 described above. For DMUL operations, the Sh_P1 control signal always indicates a 27-bit shift, which is applied in a 68-bit wide field. The resulting shifted P1 (in redundant or non-redundant form, as desired) is provided to a conditional inverter 680 that is controlled by an OPCTL signal in combination with the Inv_Ctl signal produced by sign logic circuit 744 (FIG. 7B). For DADD operations, conditional inverter 680 inverts the small operand if the Inv_Ctl signal indicates that the operation entails subtraction; for other operations, conditional inverter 680 passes its input through to addition path 614 without modification.

It should be noted that there is no necessary correlation between which pair of factors sub-product block 618 (or 616) processes for one operation and which pair it processes for another operation. For instance, instead of computing $F_2 * x_h^2$ for UFA operations and $A * x$ for PI operations, sub-product block 618 could compute $F_2 * x_h^2$ for UFA operations and $B * y$ for PI operations. Similarly, for a FILT operation, any of the products $A_0 * w_0$, $A_1 * w_1$, $B_0 * w_2$ and $B_1 * w_3$ could be computed using any of the four 14×17 multiplier circuits (i.e., circuits 806 and 808 of FIG. 8 as well as corresponding circuits in sub-product block 616) by directing the various operands appropriately. Many other possible permutations will be apparent to one of ordinary skill in the art.

3. Exponent Logic

Exponent logic block 678 of FIG. 6B computes the exponent for the double-precision product α*β. In one embodiment, exponent logic block 678 receives the 11-bit exponent portions (αexp and βexp) for fp64 operands α and β from DP operand prep block 670 of FIG. 6A. For normal fp64 operands, the mantissas are in the range [1, 2) and thus the product of mantissas is also in the range [1, 4). The exponent of the products is the sum of the exponents, and exponent logic block 678 advantageously computes that sum and provides the sum of exponents as an exponent result Rexp.

It should be noted that for fp64 input operands, each exponent is biased upward by 1023. Simply adding the received exponents would double the bias. Accordingly, exponent logic block 678 may include additional circuitry that subtracts the bias to produce an exponent result Rexp=αexp+βexp−1023. Exponent logic block 678 may be of generally conventional design and may be located at any stage of MAF unit 220 prior to the output stage. The 11-bit exponent result Rexp is passed to output control blocks 606 of stage 15 for use in generating the final result.

D. Elements in C Path

Operand C path 612, as shown in FIG. 6C, includes shift circuit 636; lookup table 662; selection muxes 666 and 684; conditional inverter circuit 690; rounding bias (b0) register 682; and adder 668. These circuits cooperate to compute a biased coefficient $F_0(x_b) + b_0$ for UFA operations and to deliver operand C as a result P0 during other operations. In some embodiments, operand C path may include a "delta block," as described in above-referenced application Ser. No. 11/359,353, that computes offset values during PI operations, supporting parallel interpolation for multiple sampling locations within a pixel.

As shown in FIG. 6C, during stages 2 and 3, lookup table 662 receives the table address Taddr from UFA preparation block 602 and returns a corresponding coefficient $F_0$. In parallel, operand C is right shifted by right shift circuit 636. Right shift circuit 636, which may be of generally conventional design, receives the control signal Sh_C, which may be generated by alignment control block 604 or by a component upstream of MAF unit 220 as described above. During stage 3, selection mux 666 selects, as a result R4, coefficient $F_0$ for a UFA operation or operand C for PI or FILT operations. During stages 4-6, the selected result R4 is inverted by a conditional inverter 667 if a subtraction is required.

Rounding bias for UFA operations is implemented using rounding bias register 682, a zero register, and selection mux 684. For UFA operations, a rounding bias b0 stored in register 682 is selected. In general, different UFA operations may use different biases; the correct bias can be selected from register 682 based on an OPCTL signal (not explicitly shown) indicating which UFA operation is being executed. For other operations, a rounding bias is not needed, and mux 684 selects the zero value.

During stage 7, adder 668 receives result R4 (inverted if appropriate) and a result R0 from selection mux 684 and computes a result P0. Adder 668 may be implemented as a 3:2 CSA that produces a result $P0_i$ in redundant form. The P0 value is provided to addition path 614.

E. Elements in Addition Path

Addition path 614, as shown in FIG. 6A, includes an add block 622, a normalization block 624, and a multiply block 626.

Figure 9:
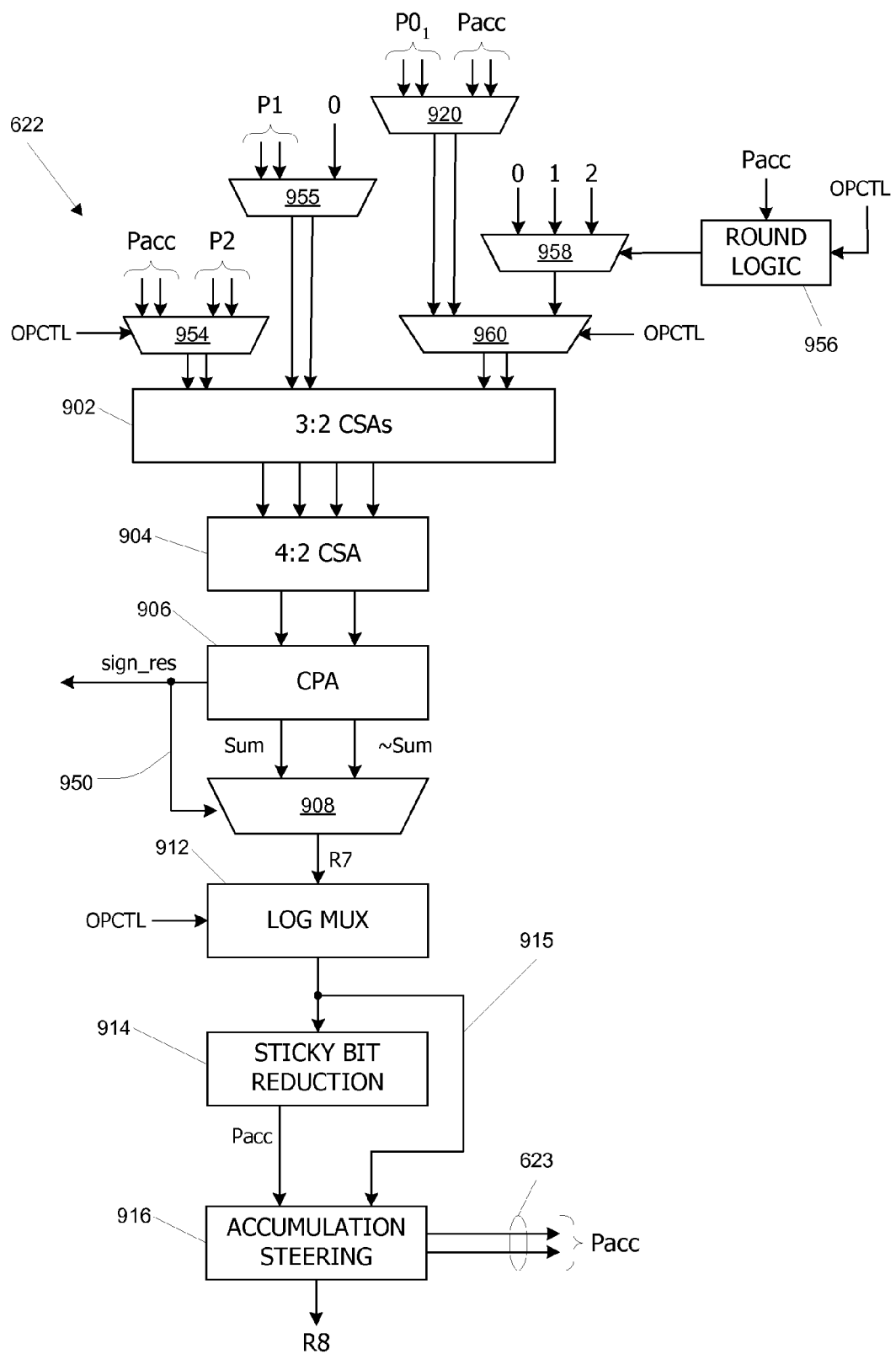
FIG. 9 is a block diagram of an add block for the multipurpose arithmetic functional unit of FIG. 6A.

FIG. 9 is a block diagram of an add block 622 that receives redundant-form results P2, P1 and P0 and computes their sum during stages 7 and 8. A selection mux 920 is driven by an OPCTL signal to select an accumulation result (running sum) Pacc for DMUL operations and the C path result P0 for all other operations.

In this example, add block 622 computes the sum using two 3:2 CSAs 902 followed by one 4:2 CSA 904 followed by one carry propagation adder (CPA) 906 that computes the result in non-redundant form and provides Sum and inverse Sum (denoted ~Sum) outputs. CSAs 902, 904 and CPA 906 may be of conventional design. CSAs 902, 904 and CPA 906 are advantageously made wide enough to add 68-bit inputs, allowing these adders to handle the iterative DMUL operation described above with reference to FIGS. 5A-5D.

The final result for UFA, PI and FILT operations is expressed in sign-magnitude format, but the multipliers and adders described herein produce results in two's complement format. Accordingly, selection mux 908 selects the Sum output as a result R7 if the sign_res signal on path 910 indicates that the output of CPA 906 is a positive result and the ~Sum output if the sign_res signal indicates a negative result. In one embodiment, the sign_res signal is just the MSB of the ~Sum output and is zero (one) for a positive (negative) result. While selecting the ~Sum output is not a true two's complement, the off-by-one error is generally not important in embodiments where PI, UFA and FILT operations both involve a degree of approximation. If desired, a plus-1 adder could be used to add 1 to the ~Sum result and obtain the two's complement result.

For DMUL operations, the products P2 and P1 are already in sign-magnitude format, the sign is positive, and the Sum result is always selected. For DADD operations, the sum is positive unless the exponents of the input operands are equal, in which case a negative sum is possible; the ~Sum result is advantageously selected where the sum is negative.

Log mux 912 passes through the result R7 from selection mux 908 unmodified unless the OPCTL signal indicates that a LOG operation is in progress. In that event, log mux 912 adds the exponent of the original floating-point operand x to the result R7.

Sticky bit reduction unit 914 includes OR-reduction logic that reduces the last 14 bits of the 68-bit result R7 to a single sticky bit, leaving a 54-bit accumulation result Pacc (plus one sticky bit) to be propagated to accumulation control unit 916. Sticky bit reduction unit 914 may be of generally conventional design, and a detailed description is omitted.

Accumulation steering unit 916 operates to select and direct results from add block 622. For UFA, PI and FILT operations, accumulation control unit 916 passes the result received via a bypass path 915 from log mux 912 as result R8 to normalization block 624. For DMUL operations, accumulation steering unit 916 directs the result Pacc from sticky bit reduction unit 914 via path 623 to the input of selection mux 920 for the next accumulation pass. When accumulation is complete, accumulation steering unit 916 directs the final Pacc result via path 623 into a rounding pass through add block 622. After completion of the rounding pass, accumulation steering unit 915 may reset Pacc to zero. In other embodiments a separate zero input is provided to selection mux 920 and selected on the first iteration of a DMUL accumulation.

For DADD operations, accumulation control unit 916 directs the first result Pacc from sticky bit reduction unit 914 via path 623 to a rounding phase through add block 622.

FIG. 9 also shows additional components used to support the rounding pass, which rounding and two's complement operations. Specifically, at the input of add block 622, selection mux 954 selects between result P2 from product path 610 and result Pacc received via path 623 from accumulation steering circuit 916 in response to an OPCTL signal, with result Pacc being selected for the rounding pass of DMUL and DADD operations and P2 being selected for UFA, PI and FILT operations, as well as the accumulation pass(es) of DMUL and DADD operations. Selection mux 955 is driven by an OPCTL signal to select 0 for the rounding pass of DMUL and DADD operations and P1 in all other cases.

For the rounding pass of DMUL and DADD operations, rounding logic 956 determines a constant (0, 1, or 2) to add, depending on the least significant bits (LSBs) of the accumulated result Pacc and/or the sign of the accumulated result Pacc. More specifically, for DMUL operations, the result is in sign-magnitude format, and rounding logic 956 determines whether to round up (add 1) or not (add 0). The determination may be made by applying conventional techniques (e.g., any of the IEEE 754 rounding rules) to process the LSBs (and sticky bit) of accumulation result Pacc. Rounding logic 956 selects the constant-1 input or the constant-0 input based on the determination. For DADD operations, as long as the exponents are unequal, the result of the addition is positive, and rounding logic 956 determines whether to round up or not as in the DMUL case. When the result is negative, the received result Pacc (which corresponds to ~Sum as described above) should be incremented by 2 to produce the appropriate positive number. Accordingly, rounding logic 956 selects the constant-2 input during DADD operations when the ~Sum output of CPA 906 was selected in add block 622; the sign bit of Pacc can be provided to rounding logic 956 and used to determine whether the sum is positive or negative.

For the rounding pass of DMUL and DADD operations, rounding logic 956 operates a selection mux 958 to propagate the selected constant to selection mux 960 for a rounding pass. Selection mux 954 selects between result P0 from offset path 612 and the constant selected by mux 958: for the rounding pass of DMUL and DADD operations, the constant is selected; for all other operations, P0 is selected.

During the rounding pass of a DMUL or DADD operation, add block 622 computes the sum of the selected inputs using two 3:2 CSAs 902 followed by one 4:2 CSA 904 followed by one carry propagation adder (CPA) 906 that computes the result in non-redundant form and provides Sum and inverse Sum (denoted ~Sum) outputs. As noted above, CSAs 902, 904 and CPA 906 are advantageously made wide enough to handle mantissas for DMUL and DADD operations.

As noted above, the addition pipeline may include multiple parallel addition paths 614 to generate multiple results in parallel. The add blocks in these other paths may be generally similar to add block 622 of FIG. 9, except that muxes 954, 955, 958, 960 and rounding logic 956 may be omitted. Further, where the additional add blocks are not used to handle double-precision mantissas, the widths of their adders and data paths may be smaller than those in block 622.

Where multiple parallel addition paths are provided, one path can be used for accumulation passes in DMUL and DADD operations while another path is used for rounding passes, as described in above-referenced application Ser. No. 11/359,353. Alternatively, a separate rounding logic stage may be added to the pipeline of FIG. 6A to handle the rounding operations.

Referring again to FIG. 6A, during stages 9 and 10, normalization block 624 left-shifts the result R8 to place a "1" in the leading mantissa position. Normalization block 624 may be of generally conventional design, and a detailed description is omitted. It should be noted that for DADD operations, normalization block 624 also receives the block exponent Bl_exp generated in alignment control block 604 (FIG. 6A) and decrements the block exponent by an amount corresponding to the left shift. For DMUL operations, normalization block 624 also increments the product exponent by 1 in the event that the product of mantissas is in the range [2, 4).

During stages 11-14, multiply block 626, which may be of generally conventional design, may be used to multiply the normalized result R9 by a perspective parameter w', to support perspective-correct interpolation. For operations where perspective correction is not desired, multiply block 626 can be bypassed using selection mux 628. For instance, multiply block 626 may be active during IPAW operations and inactive (bypassed) during all other operations.

For efficiency, perspective parameter w' can be computed once for each fragment and stored in a register (not shown) or other location accessible to multiply block 626. For example, the reciprocal (1/w) of the homogeneous coordinate w for vertices of a primitive can be computed by MAF unit 220 executing one or more RCP operations. Next, 1/w can be interpolated for a fragment location by MAF unit 220 executing an IPA operation to determine 1/w'. Finally, the reciprocal of 1/w' (which is w') is computed by MAF unit 220 executing another RCP operation. It should be noted that where multiple copies of addition path 614 are provided, each multiply block can store and use a different w' value.

F. Elements in Stage 15

Figure 10:
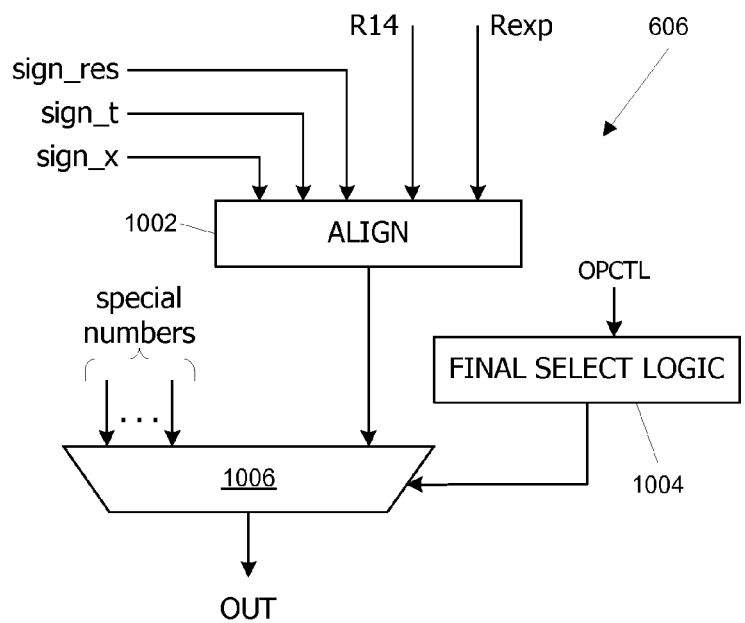
FIG. 10 is a block diagram of an output control block for the multipurpose arithmetic functional unit of FIG. 6A.

FIG. 10 is a block diagram of an output control block 606. An alignment circuit 1002 receives the result R14 and the exponent result Rexp (for DMUL and DADD operations) from selection mux 628, the sign_res signal from CPA 906, and the sign_t signal from trig preprocessing block 704 (FIG. 7A). Based on this information, alignment circuit 1002 performs final alignment, including setting a sign bit for the result and, in some instances, dropping a leading "1" for compatibility with an fp32 or fp64 output format.

Final selection logic 1004 determines whether the result R14 should be overridden by any of various "special number" results (e.g., overflows, zero) that may be defined. The determination may be based on considerations such as whether any of the inputs was an fp32 or fp64 special number (overflow, underflow), or whether overflows or underflows occurred in the arithmetic pipeline. For example, any underflow might be flushed to zero and any overflow to a maximum (or "infinite") value. Conventional logic circuits for detecting such conditions may be implemented in final selection logic 1004 and/or in earlier pipeline stages (e.g., stage 1). Output mux 1006 selects the pipeline result from alignment circuit 1002 or one of the special numbers in response to a signal on line 1008 generated by final selection logic 1004.

Referring again to FIG. 6A, the final results are provided on path OUT. In one embodiment, the result for a UFA or PI operation includes only a 24-bit sign and mantissa; the exponent portion may be determined by separate processing circuits of conventional design and appended to the result at a downstream processing stage using conventional post-processing circuits. Double-precision arithmetic results, which are wider, may be delivered over two cycles using one 32-bit output path (e.g., OUT), or a wider output path may be used to deliver a double-precision result in a single cycle.

G. Bypass Paths

Not all components of MAF unit 220 are necessary for all operations. For example, during PI operations, lookup tables 642, 644, and 662 and squaring circuit 652 are not needed; during DADD operations, sub-product blocks 618 and 616 are not needed; and during all operations except IPAW, perspective correction multiplier 626 is not needed. As described above, bypass paths are provided around such components using various selection muxes. When a particular circuit block is bypassed during an operation, that block may be set into an inactive state to reduce power consumption or allowed to operate normally with its output being ignored.

It will be appreciated that the MAF unit described herein is illustrative and that variations and modifications are possible. Many of the circuit blocks described herein provide conventional functions and may be implemented using techniques known in the art; accordingly, detailed descriptions of these blocks have been omitted. The division of operational circuitry into blocks may be modified, and blocks may be combined or varied. In addition, the number of pipeline stages and the assignment of particular circuit blocks or operations to particular stages may also be modified or varied. The selection and arrangement of circuit blocks for a particular implementation will depend in part on the set of operations to be supported, and those skilled in the art will recognize that not all of the blocks described herein are required for every possible combination of operations.

III. Examples of MAF Unit Operations

MAF unit 220 advantageously leverages the circuit blocks described above to support PI, UFA, double-precision arithmetic, and linear filtering operations in an area-efficient manner. Accordingly, the operation of MAF unit 220 depends in at least some respects on which operation is being executed. Section III.A describes the use of MAF unit 220 to perform UFA operations. Section III.B describes PI operations. Section III.C describes double-precision multiplication operations. Section III.D describes double-precision addition operations. Section III.E describes FILT operations.

A. Unary Function Approximation (UFA) Operations

For UFA operations, MAF unit 220 receives operand x and an opcode indicating which unary function is to be performed. As described above, operand x is advantageously received in a reduced form.

During stage 1, UFA preparation block 602 generates a table address Taddr and an offset $x_h$ from operand x. In addition, for trigonometric functions, UFA preparation block 602 may also perform quadrant reduction as described above.

Alignment control circuit 604 determines, based on operand x, whether shifting of products P1 or P2 will be needed and generates appropriate Sh_P1 and Sh_P2 signals.

During stage 2, the table address Taddr is provided to lookup tables 642, 644, and 662, which return the appropriate coefficients $F_2$, $F_1$, and $F_0$. It should be noted that lookup tables for different coefficients and different unary functions may be physically or logically separated, and that any addressable storage device or circuit may be operated as a "lookup table" in this context. The lookup table mechanism may also include translation circuitry for converting the received Taddr signal to a usable address, or the Taddr signal may be provided in a suitable format so that further translation is not required. Nonvolatile storage (e.g., a conventional ROM) is advantageously used so that coefficients need not be reloaded every time system power is restored, but volatile storage (e.g., RAM) could also be used if desired.

Also during stage 2, offset $x_h$ is squared in squaring circuit 652 to provide $x_h^2$. In some embodiments, the squaring operation may extend into stage 3. In parallel, μ1 selection mux 650 selects offset $x_h$.

During stage 3, multiplier $x_h^2$ is Booth encoded by SD4 recoder 658, and multiplier $x_h$ is Booth encoded by Booth encoder 656. At the end of stage 3, selection mux 660 selects Booth-encoded $x_h^2$ as Bμ2. Multiplicand selection muxes 646, 648, and 666 select coefficients $F_2$, $F_1$, and $F_0$ respectively.

During stages 4-6, sub-product block 618 computes P2=$F_2*x_h^2$ and sub-product block 616 computes P1=$F_1*x_h$. In sub-product block 618 (FIG. 8), multiplier 806 receives the upper bits of $F_2$ as the multiplicand input while multiplier 808 receives the lower bits; both multipliers 806 and 808 receive $x_h^2$ as the multiplier input. Alignment circuit 822 left-shifts the product from multiplier 806 by 14 bits, and adder 826 adds the products to compute P2. Similar operations take place in parallel within sub-product block 616 to compute product P1. Products P2 and P1 may be provided in redundant or non-redundant form as described above. In C path 612 (FIG. 6C), coefficient $F_0$ passes through on the R4 path. Selection mux 684 selects the value $b_0$ for the R0 path. (In some embodiments, rounding bias $b_0$ might not be used.)

During stage 7, right shift circuits 632 and 634 apply right shifts to results P2 and P1 in response to the Sh_P2 and Sh_P1 signals from alignment control block 604. Shifting may be applied to redundant or non-redundant forms of P2 and P1 as described above. Adder 668 adds the $F_0$ and R0 signals, producing result P0 (e.g., in carry-save form). Shifted P2 and P1 and result P0 are supplied to adder 622.

During stage 8, adder 622 completes the computation of P2+P1+P0, converts the result to a magnitude representation and, in the case of a LOG operation, adds the exponent. During stages 9 and 10, normalization block 624 normalizes the result R8 to produce result R9.

Perspective correction is generally not applicable to UFA operations, and accordingly, multiplier 626 in stages 11-14 may be bypassed using selection mux 628. The bypass path may include timing circuitry for delaying propagation of the result by an appropriate number of stages, or those stages may be skipped, making the MAF pipeline effectively shorter for unary operations.

In some embodiments, multiplier 626 might be leveraged to scale a unary function result $f(x)$ by some scale factor p. For example, a scale factor p could be supplied as an additional operand and bypassed into multiplier 626 in place of w'; multiplier 626 would then compute $p*f(x)$.

During stage 15, output control circuit 606 formats and selects the appropriate result for propagation on path OUT.

In one embodiment, it is desirable for issue circuit 204 (FIG. 2) to issue multiple UFA instructions for MAF unit 220 in one clock cycle, with all results arriving simultaneously on data transfer path 226 after some number of clock cycles. For example, a single opcode identifying a UFA instruction might be issued together with a number (e.g. four) of operands x on which the UFA operation is to be executed, with results appearing on data transfer path 226 15 clock cycles later. Where MAF unit 220 can perform only one set of table lookups per clock cycle, input and output sequencing logic can be provided to implement this desired behavior.

Figure 11:
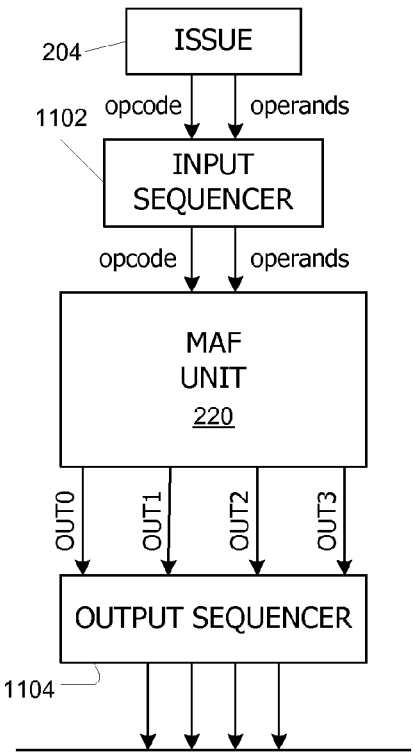
FIG. 11 is a block diagram of a multipurpose arithmetic functional unit with input and output sequencing logic according to an embodiment of the present invention.

More specifically, FIG. 11 is a block diagram showing a MAF unit 220 that is enhanced with sequencing logic. Input sequencing logic 1102 is disposed between issue unit 204 and MAF unit 220 and receives the opcode and four operands x0, x1, x2, x3 from issue unit 204. On each of the next four clock cycles, input sequencing logic 1102 forwards the opcode and one of the four operands to stage 1 of MAF unit 220. Conventional circuits for latching and forwarding data with controlled delay may be used.

Output sequencing logic 1104 is disposed between MAF unit 220 and result path 226. Output sequencing logic 1104 latches results from the four operations and, when all four have been collected, forwards the results together onto path 226. (In embodiments where MAF unit 220 has multiple parallel pipelines in addition path 614, a different addition pipeline might be used to provide the result for each of the sequential operations, as described in above-referenced application Ser. No. 11/359,353.) As with input sequencing logic 1102, conventional circuits for latching and forwarding data with controlled delay may be used. Any number of UFA operations may be sequenced in this manner.

B. Planar Interpolation (PI) Operations

For PI operations, MAF unit 220 receives parameters A, B, C and sampling location coordinates (x, y). PI operations are described herein for an embodiment where MAF unit 220 has a single pipeline in addition path 614; embodiments where MAF unit 220 has multiple pipelines in addition path 614 are described in above-referenced application Ser. No. 11/359, 353.

During stage 1, alignment control circuit 604 determines shift amounts for products P1 and P2, as well as for parameters A, B and C, and generates appropriate Sh_P1, Sh_P2, Sh_A, Sh_B, and Sh_C signals. As described above, where x and y are fixed-point numbers while A, B and C are floating-point numbers, the shift amounts will depend only on the respective exponents of A, B and C. Thus, in some embodiments, some or all of these shift signals may be determined at the time A, B and C are computed (or at some other time prior to issuing the PI instruction to MAF unit 220) and provided to MAF unit 220 with the operands.

During stage 2, shift circuits 638, 640, and 636 apply shifts determined by the Sh_A, Sh_B, and Sh_C signals to parameters A, B and C. The µ1 selection mux 650 selects operand y. Lookup tables 642, 644, 662 might or might not be accessed; any returned value will be ignored.

During stage 3, operand x is Booth encoded by Booth encoder 654 and selected as multiplier Bµ2 by selection mux 660. Operand y is Booth encoded by Booth encoder 656 and provided as multiplier Bµ1. Operands A and B are selected as multiplicands M2 and M1, respectively, by selection muxes 646, 648. Shifted operand C is selected as result R4 by selection mux 666.

During stages 4-6, sub-product block 618 computes P2=A*x and sub-product block 616 computes P1=B*y. In sub-product block 618 (FIG. 8), multiplier 806 receives the upper bits of A as the multiplicand input while multiplier 808 receives the lower bits; both multipliers 806 and 808 receive x as the multiplier input. Alignment circuit 822 left-shifts the product from multiplier 806 by 14 bits, and adder 826 adds the products to compute P2. Similar operations take place in parallel within sub-product block 616 to compute P1. Products P2 and P1 may be provided in redundant or non-redundant form, as described above. In C path 612, shifted parameter C passes through on the R4 path. Selection mux 684 select the zero value for the R0 path.

During stage 7, right shift circuits 632 and 634 apply right shifts to results P2 and P1 in response to the Sh_P2 and Sh_P1 signals from alignment control block 604. Shifting may be applied to redundant or non-redundant forms of P2 and P1 as described above. Adder 668 adds the R4 and R0 signals, producing result P0 (which is C, shifted and inverted as appropriate) in carry-save form. Shifted P2 and P1 and result P0 are supplied to adder 622.

During stage 8, adder 622 completes the computation of P2+P1+P0, converting the result to a magnitude representation R8. During stages 9 and 10, normalization block 624 normalizes the result R8 to produce result R9.

For IPAW operations, perspective correction is applied using multiplier 626 in stages 11-14. As described above, IPAW operations are advantageously performed after the perspective coordinate w has been interpolated and the interpolated value w' has been stored in an appropriate register. Where interpolation of w is performed using an IPA operation in MAF unit 220, a different w' corresponding to each pixel offset may be provided.

For IPA operations, perspective correction is not applied, and multiplier 626 in stages 11-14 is advantageously bypassed using selection mux 628. The bypass path may include timing circuitry for delaying propagation of the result by an appropriate number of cycles.

During stage 15, output control circuit 606 formats and selects the appropriate result for propagation on path OUT.

In embodiments which include input and output sequencing logic (e.g., FIG. 11), this logic can be used to sequence multiple IPA and IPAW operations if desired.

C. Double-Precision Multiplication (DMUL) Operations

For DMUL operations, MAF unit 220 receives operands $\alpha$ and $\beta$. In some embodiments, the operands are in fp64 format as described above.

During stage 1, alignment control circuit 604 sets the Sh_P1 control signal to a right-shift of 27 bits and the Sh_P2 control signal to a zero right shift. Other control signals generated by alignment control circuit 604 are not used in DMUL operations and may be set to any convenient value.

Also during stage 1, DP operand preparation block 670 (FIG. 7B) stores the mantissa portions of operands $\alpha$ and $\beta$ into registers 726 and 728 in preparation for sequential output of the multiplicand and multiplier portions. Sign logic circuit 744 determines the sign Sign_R of the product and provides the sign as the sign_res signal to output control block 606(1). DP operand preparation block 670 also extracts the exponent portions $\alpha$exp and $\beta$exp of operands $\alpha$ and $\beta$ and provides them to exponent logic block 678 in product path 610 (see FIG. 6B). Sequencer circuit 738 (FIG. 7B) operates selection muxes 734 and 736 to deliver the partial multiplicands and partial multipliers over four cycles.

Stages 2-8 are iterated four times in succession. The iterations may be pipelined with each other. For each iteration i=0, 1, 2, 3, sequencer circuit 738 delivers a triplet of operands $(\alpha_H, \alpha_L, \beta_i)$ to product path 610 of FIG. 6B as described above. C path 612 may operate or be placed in a power-saving mode since result P0 is not used in subsequent stages.

During each iteration of stage 2, muxes 672 and 650 in product path 610 each select operand $\beta_i$ as the multiplier. Exponent logic 678 operates on the exponents αexp and βexp to produce a result exponent Rexp as described above.

During each iteration of stage 3, multiplier βi is Booth encoded by Booth encoder 654 and also by Booth encoder 656. At the end of stage 3, selection mux 660 selects Booth-encoded $\beta_i$ as Bμ2. Multiplicand selection muxes 646 and 648 select partial operands $\alpha_H$ and $\alpha_L$, respectively.

During each iteration (i) of stages 4-6, sub-product block 618 computes the 45-bit sub-product P2=$\alpha_H$*$\beta_i$ and sub-product block 616 computes the 45-bit sub-product P1=$\alpha_L$*$\beta_i$. In sub-product block 618 (FIG. 8), multiplier 806 receives the upper bits of $\alpha_H$ as the multiplicand input while multiplier 808 receives the lower bits; both multipliers 806 and 808 receive $\beta_i$ as the multiplier input. Alignment circuit 822 left-shifts the product from multiplier 806 by 14 bits, and adder 826 adds the products to compute P2. Similar operations take place in parallel within sub-product block 616 to compute P1

During each iteration of stage 6, right shift circuit 634 right-shifts P1 by 28 bits, and conditional inverter 680 passes through the shifted P1 without further modification. Right-shift circuit 632 does not right-shift P2.

During each iteration of stage 8, adder 622 adds the new products P2 and P1 to the accumulated result (Pacc), which is initially zero as noted above. Log mux 912 passes the result through to sticky bit reduction logic 914, where the 14 LSBs are reduced to a single sticky bit that propagates with the result Pacc. Accumulation steering logic 916 directs the result Pacc to selection mux 920 for the next iteration.

After the final iteration of stage 8, the final result Pacc can be propagated once more to adder 622 on path 623 for a single rounding pass through stage 8. More specifically, selection mux 954 selects the result Pacc. Rounding logic 956 operates selection mux 958 in response to the LSBs (including the sticky bit) of Pacc to select a rounding constant, either 0 or 1. The selected constant is propagated to CSA 902 by selection mux 960. At the end of the rounding pass in stage 8, the rounded result is delivered as result R8 to normalization block 624.

It should be noted that in embodiments where addition path 614 includes multiple parallel pipelines, one pipeline can be used for the four accumulation passes while a second pipeline is used for the rounding pass, e.g., as described in above-referenced application Ser. No. 11/359,353. In still other embodiments, rounding may be provided using additional circuits (not explicitly shown) in addition path 614. Where the rounding pass does not reuse adder 622, the rounding pass can take place in parallel with the first iteration of a subsequent DMUL operation through adder 622. However, the initiation of operations such as UFA, PI or FILT are advantageously delayed long enough that they do not collide with the rounding pass (which introduces an extra stage of delay).

During stages 9 and 10, normalization block 624 normalizes the result R8 to produce result R9. For DMUL operations, normalization block 624 increments the product exponent by 1 if the product of the mantissas is in the range [2, 4).

Perspective correction is generally not applicable to DMUL operations, and accordingly, multiplier 626 in stages 11-14 may be bypassed using selection mux 628. As noted above, the bypass path may include timing circuitry for delaying propagation of the result by an appropriate number of stages, or those stages may be skipped.

During stage 15, output control circuit 606 formats and selects the appropriate result for propagation on path OUT.

It should be noted that throughput for MAF unit 220 is reduced for DMUL operations as compared to UFA, PI or FILT operations. In the embodiment described herein, MAF unit 220 completes PI, UFA or FILT operations at a rate of one result per clock cycle. (PI throughput may be higher in embodiments with multiple parallel addition pipelines, as described in above-referenced application Ser. No. 11/359, 353.) When a DMUL instruction is issued, issue logic 204 of FIG. 2 waits several cycles before issuing the next instruction, to allow time for the instruction to iterate through adder 622. For instance, if issue logic 204 can issue one UFA, PI or FILT instruction per clock cycle, then after each DMUL instruction, issue logic 204 advantageously waits three clock cycles before issuing the next instruction to MAF unit 220 in order to avoid potential collisions with the DMUL instruction. Thus, in the embodiment described herein, the throughput for DMUL operations in MAF unit 220 is approximately ¼ the throughput for PI, UFA or FILT operations. MAF unit 220, however, has advantages in terms of chip area and cost, particularly because it can also be used for other operations.

D. Double-Precision Addition (DADD) Operations

For DADD operations, MAF unit 220 receives operands α and β. In some embodiments, the operands are in fp64 format as described above.

During stage 1, alignment control circuit 604 compares the exponent portions of operands α and β and sets Sh_P1 to apply a right shift to the smaller of the operands. Alignment control circuit 604 also generates block exponent (Bl_exp) and swap control (Swap) signals. DP preparation block 670 (FIG. 7B) forwards the mantissas αM and βM to product path 610. Sign logic circuit 744 determines whether the operation entails a subtraction and generates the appropriate Inv_Ctl signal.

During stage 3, muxes 646 and 648 of product path 610 (FIG. 6B) are operated as swap muxes, with mux 646 (748) selecting the larger (smaller) of operands α and β as M2 (M1) based on the Swap signal from alignment control circuit 604. During stages 4-6, M2 and M1 are bypassed around sub-product blocks 618 and 616, using respective bypass paths 617 and 615.

During stage 7, selection muxes 674 and 676 select the bypassed values. On the small operand path, shift circuit 634 applies the shift specified by the Sh_P1 control signal to the small operand M1, and conditional inverter 680 inverts M1 if a subtraction is in progress.

During stage 8, add block 622 computes the sum P2+P1. Selection mux 920 may be operated to select Pacc, which is advantageously initialized to zero for each DADD operation. Initialization of Pacc to zero may be accomplished in the manner described above for DMUL operations. Sticky bit reduction logic 914 may be used, although the result in this instance is 53 or 54 bits. Accumulation steering logic 916 delivers the result Pacc to add block 622 for a rounding pass through stage 8 via path 623.

In the rounding pass through stage 8, selection mux 954 selects the result Pacc. Rounding logic 956 operates selection mux 958 in response to the LSBs (including the sticky bit) of Pacc to select a rounding constant, either 0, 1, or 2. As noted above, 0 or 1 may be selected for positive sums to implement rounding, while 2 may be selected for negative results, to implement two's complement inversion. The selected constant is propagated to CSA 902 by selection mux 960. At the end of the rounding pass in stage 8, the rounded result is delivered as result R8 to normalization block 624.

As with DMUL operations, in embodiments where addition path 614 includes multiple parallel pipelines, one pipeline can be used for the addition pass of a DADD operation while a second pipeline is used for the rounding pass, e.g., as described in above-referenced application Ser. No. 11/359, 353. In still other embodiments, rounding and normalization may be provided using additional circuits (not explicitly shown) in addition path 614. Where the rounding pass does not reuse adder 622, the rounding pass can take place in parallel with the addition pass of a subsequent DADD operation through adder 622. However, the initiation of operations such as UFA, PI or FILT are advantageously delayed long enough that they do not collide with the rounding pass (which introduces an extra stage of delay).

During stages 9 and 10, normalization block 624 normalizes the result R8 to produce result R9. Normalization block 624 also modifies the block exponent Bl_exp as needed in the event that the mantissa is shifted during normalization, thereby producing a final exponent Rexp.

Perspective correction is generally not applicable to DADD operations, and accordingly, multiplier 626 in stages 11-14 may be bypassed using selection mux 628. As noted above, the bypass path may include timing circuitry for delaying propagation of the result by an appropriate number of stages, or those stages may be skipped.

During stage 15, output control circuit 606 formats and selects the appropriate result for propagation on path OUT.

In an alternative embodiment, C path 612 shown in FIG. 6C is used as a small operand path, while the P2 (or P1) path is used as the large operand path. A multiplexer operable as a swap mux may be added at stage 2 (prior to shifter 636), with the small operand being directed to the R4 path. Conditional inverter 690 is used to invert the small operand in the event of a subtraction.

It should be noted that throughput for MAF unit 220 is reduced for DADD operations as compared to UFA, PI or FILT operations. In the embodiment described herein, MAF unit 220 completes PI, UFA or FILT operations at a rate of one result per clock cycle. When a DADD instruction is issued, issue logic 204 of FIG. 2 waits at least one cycle before issuing the next instruction to MAF unit 220, to allow time for the instruction to propagate twice through adder 622. For instance, if issue logic 204 can issue one UFA, PI or FILT instruction per clock cycle, then after a DADD instruction, issue logic 204 waits one clock cycle before issuing the next instruction to MAF unit 220 in order to avoid potential collisions with the DADD instruction. Thus, in the embodiment described herein, the throughput for DADD operations in MAF unit 220 is approximately ½ the throughput for PI, UFA or FILT operations. MAF unit 220, however, has advantages in terms of chip area and cost, particularly because it can also be used for other operations.

E. Linear Filtering (FILT) Operations

For FILT operations, MAF unit receives fp16 coefficient operands $A_0, A_1, B_0$ and $B_1$, s13 coordinate operands $w_0, w_1, w_2, w_3$, and an fp32 "accumulator" operand C. Operand C is referred to as an "accumulator" in this context because it is possible to accumulate successive filter results, e.g., by storing the result of a FILT operation in a register, then supplying the content of that register as operand C to a subsequent FILT operation.

During stage 1, the exponent portions of the four coefficient operands $A_0, A_1, B_0, B_1$ and accumulator operand C are supplied to alignment control circuit 604. Alignment control circuit 604 determines the relative alignment between products $A_0*w_0$ and $A_1*W_1$ and generates appropriate Sh_P2(0) and Sh_P2(1) signals. Similarly, alignment control circuit 604 also determines the relative alignment between products $B_0*w_2$ and $B_1*W_3$ and generates appropriate Sh_P1(0) and Sh_P1(1) signals. In addition, alignment control circuit 604 determines shift amounts for products P1 and P2, as well as for accumulator operand C, and generates appropriate Sh_P1, Sh_P2, and Sh_C signals. Where $w_0$-$w_3$ are fixed-point numbers while the coefficients $A_0, A_1, B_0, B_1$ and C are floating-point numbers, the shift amounts will depend only on the respective exponents of the coefficients and C. Thus, in some embodiments, some or all of these shift signals may be determined at the time the coefficients and C are computed (or at some other time prior to issuing the FILT instruction to MAF unit 220) and provided to MAF unit 220 with the operands.

During stage 3, coordinates $w_0$ and $w_1$ can be Booth-encoded by Booth encoders 814 and 816 (shown in FIG. 8). At the end of stage 3, selection muxes 810 and 812 select Booth-encoded $w_0$ and $w_1$, respectively, as the inputs to multipliers 806 and 808. Multiplicand selection mux 804 selects the mantissa portion of operand $A_0$ as the multiplicand input for multiplier 806 and the mantissa portion of operand $A_1$ as the multiplicand input for multiplier 808. In parallel, coordinates $w_2$ and $w_3$ are Booth-encoded and selected as multiplier inputs by circuitry (not explicitly shown) corresponding to that shown in FIG. 8, and mantissa portions of operands $B_0$ and $B_1$ are selected as multiplicand inputs. In C path 612, accumulator operand C is shifted by circuit 636 in response to the Sh_C signal and selected as R4 by selection mux 666.

During stages 4-6, multiplier 806 computes $A_0*w_1$ while multiplier 808 computes $A_1*w_1$. Alignment control circuits 822 and 824 respond to Sh_P2(0) and Sh_P2(1) signals, respectively, to align the two products; adder 826 adds them to produce $P2=A_0*w_0+A_1*w_1$. In parallel, two corresponding multipliers (not explicitly shown) compute $B_0*w_2$ and $B_1*w_3$, respectively. These products are aligned and added by appropriate circuits to produce $P1=B_0*w_2+B_1*w_3$. In C path 612, accumulator operand C is inverted if appropriate by conditional inverter 690 while selection mux 684 selects its zero input as R0.

During stage 7, right shift circuits 632 and 634 apply right shifts to results P2 and P1 in response to the Sh_P2 and Sh_P1 signals from alignment control block 604. Shifting may be applied to redundant or non-redundant forms of P2 and P1 as described above. Adder 668 adds the R4 and R0 (zero) signals, producing result P0 (which is the shifted and, if appropriate, inverted accumulator operand C) in carry-save form. Shifted P2 and P1 and C-path result P0 are supplied to adder 622.

During stage 8, adder 622 completes the computation of P2+P1+P0, converting the result to a magnitude representation R8. During stages 9 and 10, normalization block 624 normalizes the result R8 to produce results R9.

For FILT operations, perspective correction is not applied, and multiplier 626 in stages 11-14 is advantageously bypassed using selection mux 628. The bypass path may include timing circuitry for delaying propagation of the result by an appropriate number of cycles.

During stage 15, output control circuit 606 formats and selects the appropriate result for propagation on path OUT.

In embodiments which include input and output sequencing logic (e.g., FIG. 11), this logic can be used to sequence multiple FILT operations if desired.

IV. Further Embodiments

While the invention has been described with respect to specific embodiments, one skilled in the art will recognize that numerous modifications are possible. For instance, a MAF unit may be implemented to support more, fewer, or different functions in combination and to support operands and results in any format or combinations of formats.

In one alternative embodiment, MAF unit 220 leverages multiplier 626 as a general-purpose multiplication circuit to support a single-precision floating point or integer multiply (SMUL) operation in addition to the various operators described above. In one embodiment, the SMUL operation for operands (factors) $a_1$ and $a_2$ is implemented by bypassing the operands into multiplier block 626. An embodiment of MAF unit 220 that supports an SMUL operation is described in above-referenced application Ser. No. 11/359,353.

In another alternative embodiment, MAF unit 220 may also support a general quadratic polynomial operation that computes $a_2*x^2+a_1*x+a_0$ for arbitrary coefficients $a_2$, $a_1$, $a_0$, which can be supplied on the same paths as parameters A, B, and C. MAF unit 220 might also be extended to support interpolation in three dimensions, cubic polynomial computations and so on.

In still another embodiment, MAF unit 220 might support a half-precision sum of products operation that computes:

$$Sum = A*Q_1+B*Q_2+C, \qquad (Eq.\ 6)$$

where operands A, $Q_1$, $Q_2$ are all in a half-precision format (e.g., fp16) and C is in a single-precision format (e.g., fp32). For instance, the pair of multipliers in each sub-product block in FIG. 8 is large enough to support multiplication of two fp16 mantissas, and exponent logic can be provided to determine a block exponent for each product. It should be noted that the operation of Eq. 6 can also be executed iteratively using operand C as an accumulator, thereby allowing any number of products to be summed using fewer instructions than conventional floating-point multiply-add.

Further, for PI operations, instead of supplying the interpolation parameters A, B, and C as operands together with the PI opcode (x, y) operands as described above, these parameters might be provided to the MAF unit in advance and stored by the MAF unit, e.g., in internal state registers, for use in subsequent PI operations. A special opcode may be used to signal the MAF unit to store or update these parameter values.

In one embodiment, MAF unit 220 is implemented in a graphics processing unit, and the various operations described may be invoked at various stages of a rendering process. For instance, planar interpolation may be used to generate attribute values for a primitive, and filtering operations may be used during texture operations or the like. In some embodiments, texture operations are streaming operations in which input operands and results are not stored in processor registers while other MAF unit operations are register-based (meaning that operation results are stored in processor registers; source operands may be obtained from processor registers or provided as immediate operands). The instruction issue logic is advantageously configured to insert the streaming texture operations into the instruction sequence as needed. Since double-precision operations are generally not used during graphics processing, the MAF unit can accept a new instruction on each clock cycle and streaming texture operations can be inserted as appropriate. In other embodiments, all MAF unit operations can be implemented as register-based operations, resulting in a simplification of instruction issue.

Double-precision multiplication may be implemented in any functional unit that provides one or more multipliers capable of generating sub-products and a sufficiently wide adder to accumulate the sub-products. Those skilled in the art will recognize that the principle of dividing the product into sub-products to be accumulated can be extended to any division, not limited to the particular divisions described herein. Any number of sub-products may be generated in parallel (depending on the availability of multipliers), and any number of iterations may be performed to accumulate the product result.

"Double precision," "single precision," and "half precision" as used herein, are not limited to the fp64, fp32 and fp16 formats used as examples. These terms refer generally to different floating-point formats where the "double precision" format uses a larger number of bits to represent a larger range of values and/or a higher precision (e.g., more significand bits) in the values represented than the "single precision" format and the "half precision" format uses a smaller number of bits to represent a smaller range of values and/or a lower precision (e.g., fewer significand bits) than the "single precision" format.

The various bypass paths and pass-throughs described herein may also be varied. In many instances, where a bypass path around a circuit block is described, that path may be replaced by an identity operation (i.e., an operation with no effect on its operand, such as adding zero or multiplying by one) in that block and vice versa. A circuit block is bypassed during a given operation may be placed into an idle state (e.g., a reduced power state) or operated normally with its result being ignored by downstream blocks, e.g., through operation of selection muxes or other circuits.

The division of the MAF pipeline into stages is arbitrary. The pipeline may include any number of stages, and the combination of components at each stage may be varied as desired. Functionality ascribed to particular blocks herein may also be separated across pipeline stages; for instance, a multiplier tree might occupy multiple stages.

The functionality of various blocks may also be modified. In some embodiments, for example, different adder circuits or multiplier circuits may be used, and use of Booth2 encoding (or any other encoding) for multiplication is not required.

In addition, the MAF unit has been described in terms of circuit blocks to facilitate understanding; those skilled in the art will recognize that the blocks may be implemented using a variety of circuit components and layouts and that blocks described herein are not limited to a particular set of components or physical layout. Blocks may be physically combined or separated as desired.

A processor may include one or more MAF units in an execution core. For example, where superscalar instruction issue (i.e., issuing more than one instruction per cycle) or SIMD (single-instruction, multiple-data) instruction issue is desired, multiple MAF units may be implemented, and different MAF units may support different combinations of functions. A processor may also include multiple execution cores, and each core may have its own MAF unit(s).

While the invention has been described with reference to a graphics processor, those skilled in the art will appreciate that the present invention may also be employed in other processors such as math co-processors, vector processors, or general-purpose processors.

Thus, although the invention has been described with respect to specific embodiments, it will be appreciated that the invention is intended to cover all modifications and equivalents within the scope of the following claims.

What is claimed is:

1. A multipurpose functional unit for a processor, the functional unit comprising:

an input section configured to receive an opcode designating one of a plurality of supported operations to be performed and one or more operands on which the designated operation is to be performed, the operations including a linear filtering (FILT) operation and a double-precision multiplication (DMUL) operation, the input section being further configured to generate a plurality of control and data signals in response to the received opcode and operands;

a multiplication pipeline including a plurality of sub-product blocks, each including a plurality of multiplier circuits, the multiplication pipeline being configured to receive a first subset of the control and data signals from the input section, the multiplication pipeline being configured to select a plurality of factors based on the received control and data signals and to operate the plurality of multiplier circuits to compute one or more products from the plurality of factors, wherein in the event the opcode designates the FILT operation, a first multiplier circuit in a first sub-product block receives a first filter coefficient A0 and a first coordinate w0 to compute a first product A0*w0, a second multiplier circuit in the first sub-product block receives a second filter coefficient A1 and a second coordinate w1 to compute a second product A1*w1, an adder in the first sub-product block computes a first sum A0*w0+A1*w1, a first multiplier circuit in a second sub-product block receives a third filter coefficient B0 and a third coordinate w2 to compute a third product B0*w2, a second multiplier circuit in the second sub-product block receives a fourth filter coefficient B1 and a fourth coordinate w3 to compute a fourth product B1*w3, and an adder in the second sub-product block computes a second sum B0*w2+B1*w3, wherein in the event that the opcode designates the DMUL operation, for each of a plurality of iterations within the functional unit: a first portion and a second portion of a mantissa of a first input operand are selected as inputs M2 and M1, respectively; a portion of a mantissa of a second input operand is selected as both of inputs µ2 and µ1, wherein a different portion of the mantissa of the second input operand is selected for each of the plurality of iterations; and a pair of multiplier circuits in the functional unit compute products of the form M2*µ2 and M1*µ1 from the selected inputs M2, µ2, M1, and µ1, and an addition pipeline configured to selectively receive one or more products from the multiplication pipeline and to perform an addition operation using the one or more products to produce an operation result, wherein in the event the opcode designates the FILT operation, the addition pipeline adds the first sum, the second sum, and an operand C, wherein in the event the opcode designates the DMUL operation, the addition pipeline adds the products M2*µ2 and M1*µ1 to a running sum, wherein the FILT operation is executed in a single pass through the multiplication pipeline and the addition pipeline and the DMUL operation is executed using multiple iterations through at least a portion of the multiplication pipeline and at least a portion of the addition pipeline, wherein each of the multiplier circuits has a width less than half of a double-precision mantissa size.

2. The functional unit of claim 1 wherein each of the sub-product blocks further comprises:

a pair of alignment circuits coupled to the first and second multiplier circuits, the pair of alignment circuits being configured to apply an alignment shift to the products of the first and second multiplier circuits in response to one of the first subset of control signals; and the adder circuit coupled to the pair of alignment circuits, the adder circuit being configured to receive the aligned products from the pair of alignment circuits and to add the aligned products to generate a product.

3. The functional unit of claim 2 wherein the multiplication pipeline is further configured such that in the event that the opcode designates the FILT operation, the alignment shift applied by each alignment circuit in each sub-product block is determined based on exponents of the filter coefficients multiplied by the first and second multipliers in that sub-product block.

4. The functional unit of claim 2 wherein the plurality of supported operations further includes a unary function approximation (UFA) operation and a planar interpolation (PI) operation and wherein the UFA operation and the PI operation are each executed using a single pass through the multiplication pipeline and the addition pipeline.

5. The functional unit of claim 4 wherein:

the UFA operation for an input operand x and a unary function $f(x)$ to be approximated includes computation of a quadratic polynomial of the form:

$$f(x) \approx F_2(x_b)*x_h^2 + F_1(x_b)*x_h + F_0(x_b),$$

wherein $x_b$ is a baseline value, $x_h$ is the difference between the input operand x and the baseline value $x_b$, and $F_2$, $F_1$ and $F_0$ are coefficients determined based on the baseline value $x_b$ and the unary function $f(x)$; and the PI operation for input coordinates (x, y) includes computation of a planar function U(x, y) of the form:

$$U(x,y) = A*x + B*y + C,$$

wherein A, B and C are interpolation parameters.

6. The functional unit of claim 5 wherein the multiplication pipeline is further configured such that in the event that the opcode designates the UFA operation, a first one of the sub-product blocks is operated to compute the product $F_2(x_b)*x_h^2$ and a second one of the sub-product blocks is operated to compute the product $F_1(x_b)*x_h$.

7. The functional unit of claim 5 wherein the multiplication pipeline is further configured such that in the event that the opcode designates the PI operation, a first one of the sub-product blocks is operated to compute the product A*x and a second one of the sub-product blocks is operated to compute the product B*y.

8. A graphics processor comprising:

a multipurpose functional unit configured to receive an opcode designating one of a plurality of supported operations to be performed and one or more operands on which the designated operation is to be performed, the operations including a linear filtering (FILT) operation, a double-precision multiplication (DMUL) operation, the multipurpose functional unit having:

an input section configured to generate a plurality of control and data signals in response to the received opcode and operands;

a multiplication pipeline configured to receive a first subset of the control and data signals from the input section, the multiplication pipeline being configured to select a plurality of factors based on the received control and data signals and to operate a plurality of sub-product blocks, each comprising a plurality of multiplier circuits, to compute one or more products from the plurality of factors, wherein in the event the opcode designates a FILT operation, a first multiplier circuit in a first sub-product block receives a first filter coefficient A0 and a first coordinate w0 to compute a first product A0*w0, a second multiplier circuit in the first sub-product block receives a second filter coefficient A1 and a second coordinate w1 to compute a second product A1*w1, an adder in the first sub-product block computes a first sum A0*w0+A1*w1, a first multiplier circuit in a second sub-product block receives a third filter coefficient B0 and a third coordinate w2 to compute a third product B0*w2, a second multiplier circuit in the second sub-product block receives a fourth filter coefficient B1 and a fourth coordinate w3 to compute a fourth product B1*w3, and an adder in the second sub-product block computes a second sum B0*w2+B1*w3, wherein in the event that the opcode designates the DMUL operation, for each of a plurality of iterations within the functional unit: a first portion and a second portion of a mantissa of a first input operand are selected as inputs M2 and M1, respectively; a portion of a mantissa of a second input operand is selected as both of inputs $\mu2$ and $\mu1$, wherein a different portion of the mantissa of the second input operand is selected for each of the plurality of iterations; and a pair of multiplier circuits in the functional unit compute products of the form $M2*\mu2$ and $M1*\mu1$ from the selected inputs M2, $\mu2$, M1, and $\mu1$; and an addition pipeline configured to selectively receive one or more products from the multiplication pipeline and perform an addition operation using the one or more products to produce an operation result;

wherein in the event the opcode designates a FILT operation, the addition pipeline adds the first sum, the second sum, and an operand C, wherein in the event the opcode designates the DMUL operation, the addition pipeline adds the products $M2*\mu2$ and $M1*\mu1$ to a running sum, wherein each of the multiplier circuits has a width less than half of a double-precision mantissa size.

9. The graphics processor of claim 8 wherein a single-precision operation is performed in a single pass through the multiplication pipeline and the addition pipeline and wherein the DMUL operation is executed using multiple iterations through at least a portion of the multiplication pipeline and at least a portion of the addition pipeline.

10. The graphics processor of claim 9 wherein the single precision operation includes the linear filtering (FILT) operation.

11. The graphics processor of claim 10 wherein the plurality of supported operations includes a texture filtering operation.

12. The graphics processor of claim 10 wherein the plurality of supported operations includes an anisotropic filtering operation.

13. The graphics processor of claim 8 wherein the plurality of supported operations includes a general-purpose computation.

14. The graphics processor of claim 8 wherein the plurality of supported operations includes one or both of a unary function approximation (UFA) operation or a planar interpolation (PI) operation.

15. The graphics processor of claim 8 wherein each of the sub-product blocks further comprises:

a pair of alignment circuits coupled to the first and second multiplier circuits, the pair of alignment circuits being configured to apply an alignment shift to the products of the first and second multiplier circuits in response to one of the first subset of control signals; and the adder circuit coupled to the pair of alignment circuits, the adder circuit being configured to receive the aligned products from the pair of alignment circuits and to add the aligned products to generate a product.

16. A method for operating a functional unit of a processor, the method comprising:

receiving an opcode designating one of a plurality of supported operations to be performed and one or more operands on which the designated operation is to be performed, the plurality of supported operations including a double-precision multiplication (DMUL) operation and a linear filtering (FILT) operation that operates on operands at less than double precision;

in the event that the opcode designates the FILT operation:

operating a plurality of sub-product blocks in the functional unit in parallel to compute products of a plurality of coefficient operands and a corresponding plurality of coordinate operands, wherein each of the sub-product blocks includes a plurality of multiplier circuits having a width less than half of a double-precision mantissa size, wherein a first multiplier circuit in a first sub-product block receives a first filter coefficient A0 and a first coordinate w0 to compute a first product A0*w0, a second multiplier circuit in the first sub-product block receives a second filter coefficient A1 and a second coordinate w1 to compute a second product A1*w1, a first multiplier circuit in a second sub-product block receives a third filter coefficient B0 and a third coordinate w2 to compute a third product B0*w2, and a second multiplier circuit in the second sub-product block receives a fourth filter coefficient B1 and a fourth coordinate w3 to compute a fourth product B1*w3;

operating a plurality of adders in the functional unit in parallel to add pairs of the products to compute a plurality of partial sums, where an adder in the first sub-product block computes a first sum A0*w0+A1*w1 and an adder in the second sub-product block computes a second sum B0*w2+B1*w3; and operating a further addition block in the functional unit to add the first sum, the second sum, and an operand C; and in the event that the opcode designates the DMUL operation: for each of a plurality of iterations within the functional unit:

selecting a first portion and a second portion of a mantissa of a first input operand as inputs M2 and M1, respectively;

selecting a portion of a mantissa of a second input operand as both of inputs $\mu2$ and $\mu1$, wherein a different portion of the mantissa of the second input operand is selected for each of the plurality of iterations;

operating the plurality of sub-product blocks in the functional unit to compute products of the form $M2*\mu2$ and $M1*\mu1$ from the selected inputs M2, $\mu2$, M1, and $\mu1$; and operating the addition block in the functional unit to add the products $M2*\mu2$ and $M1*\mu1$ to a running sum.

17. The method of claim 16 wherein the plurality of supported operations further includes a unary function approximation (UFA) operation and a planar interpolation (PI) operation.

18. The method of claim 17 further comprising, in the event that the opcode designates the UFA operation or the PI operation:

in response to the opcode and the one or more operands, selecting a plurality of inputs M2, $\mu$2, M1, $\mu$1 and M0;

operating the first sub-product block in the functional unit to compute the product M2*$\mu$2;

in parallel with operating the first sub-product block, operating the second sub-product block in the functional unit to compute portions of the product M1*$\mu$1; and operating the further addition block in the functional unit to compute an operation result of the form M2*$\mu$2+M1*$\mu$1+M0 from the products M2*$\mu$2 and M1*$\mu$1 and the selected input M0.

\* \* \* \* \*